April 3, 1945. H. L. PITMAN 2,372,681
COMBINED TYPEWRITING AND COMPUTING MACHINE
Filed May 27, 1940 13 Sheets-Sheet 3
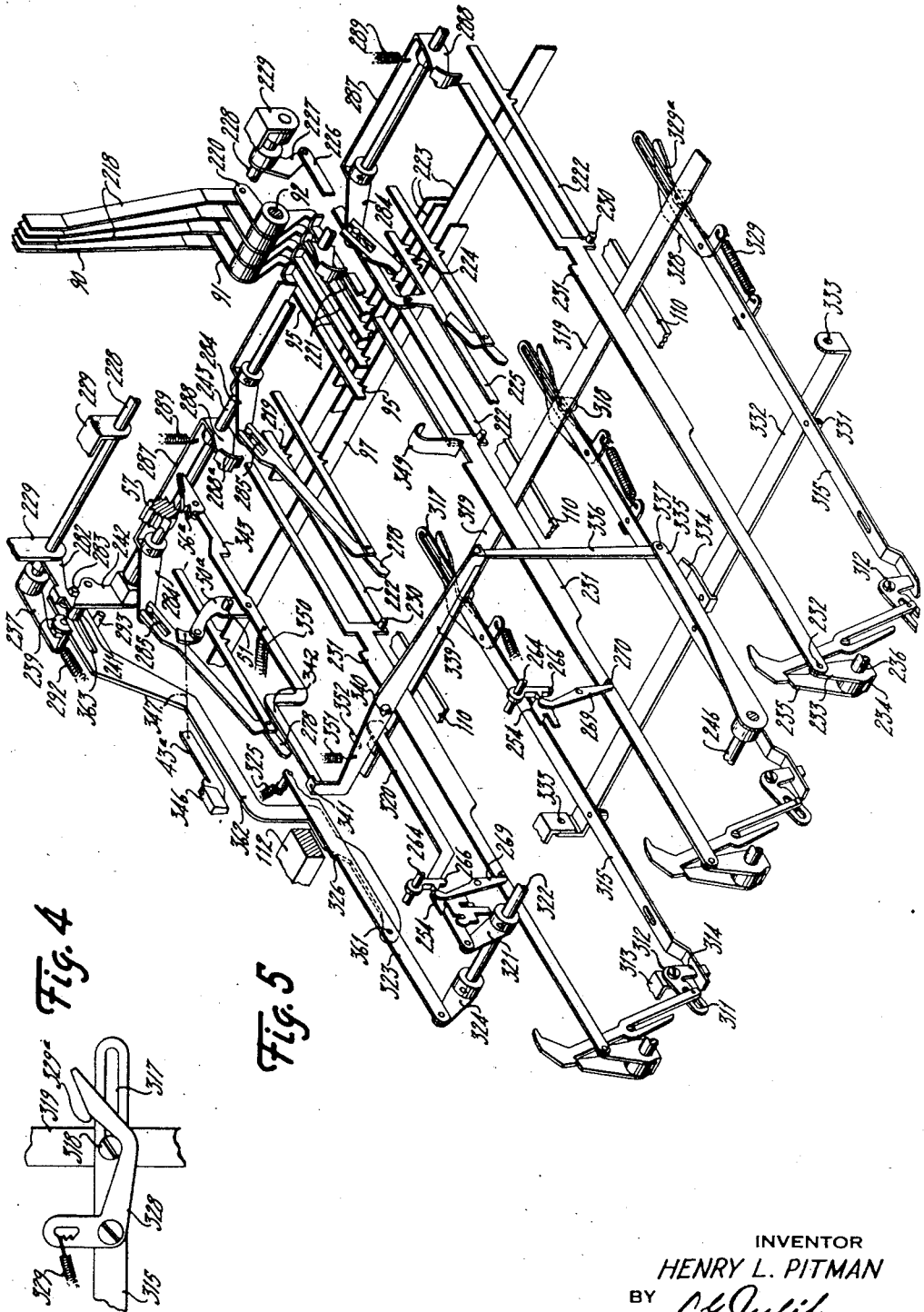
INVENTOR
HENRY L. PITMAN
BY
ATTORNEY

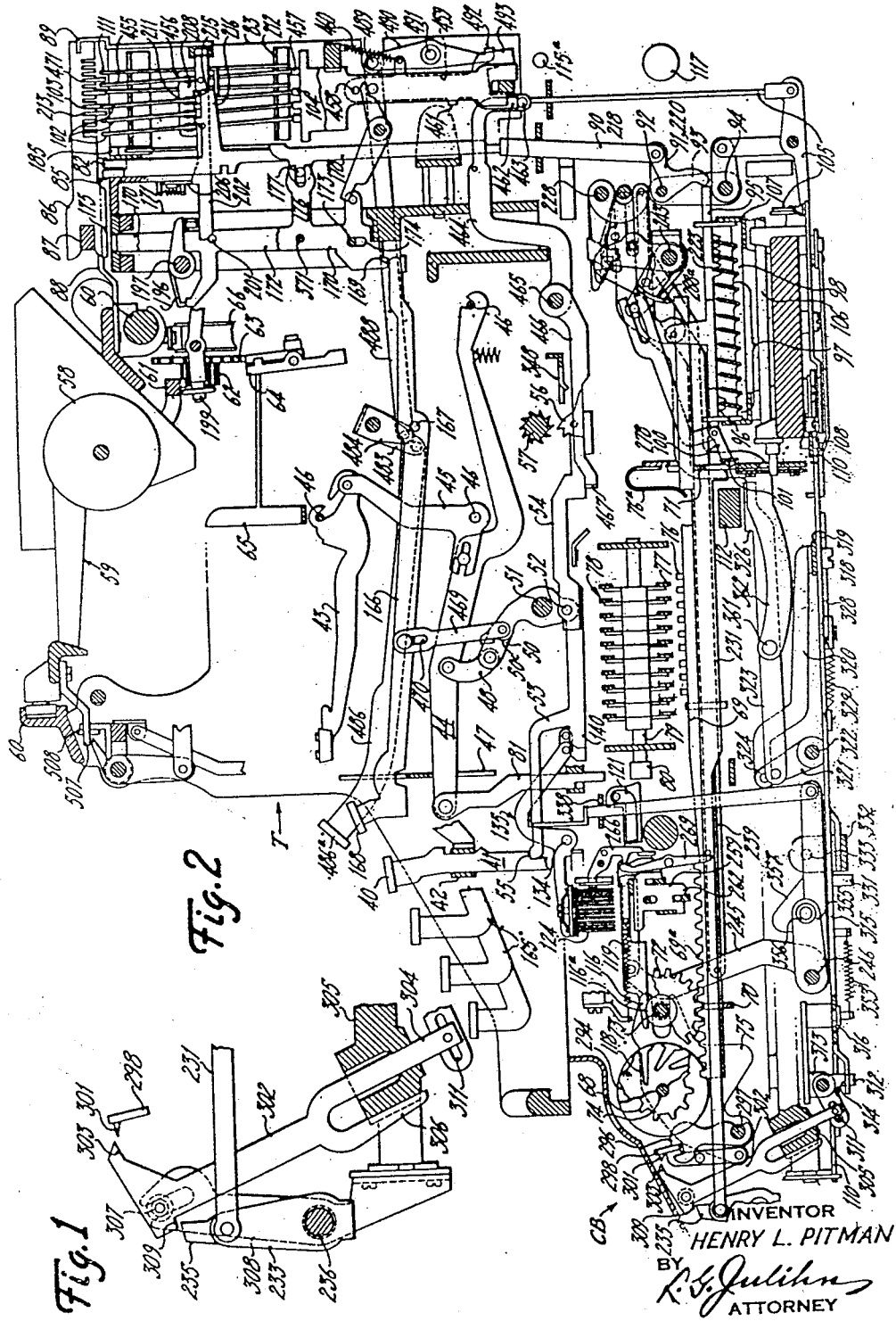

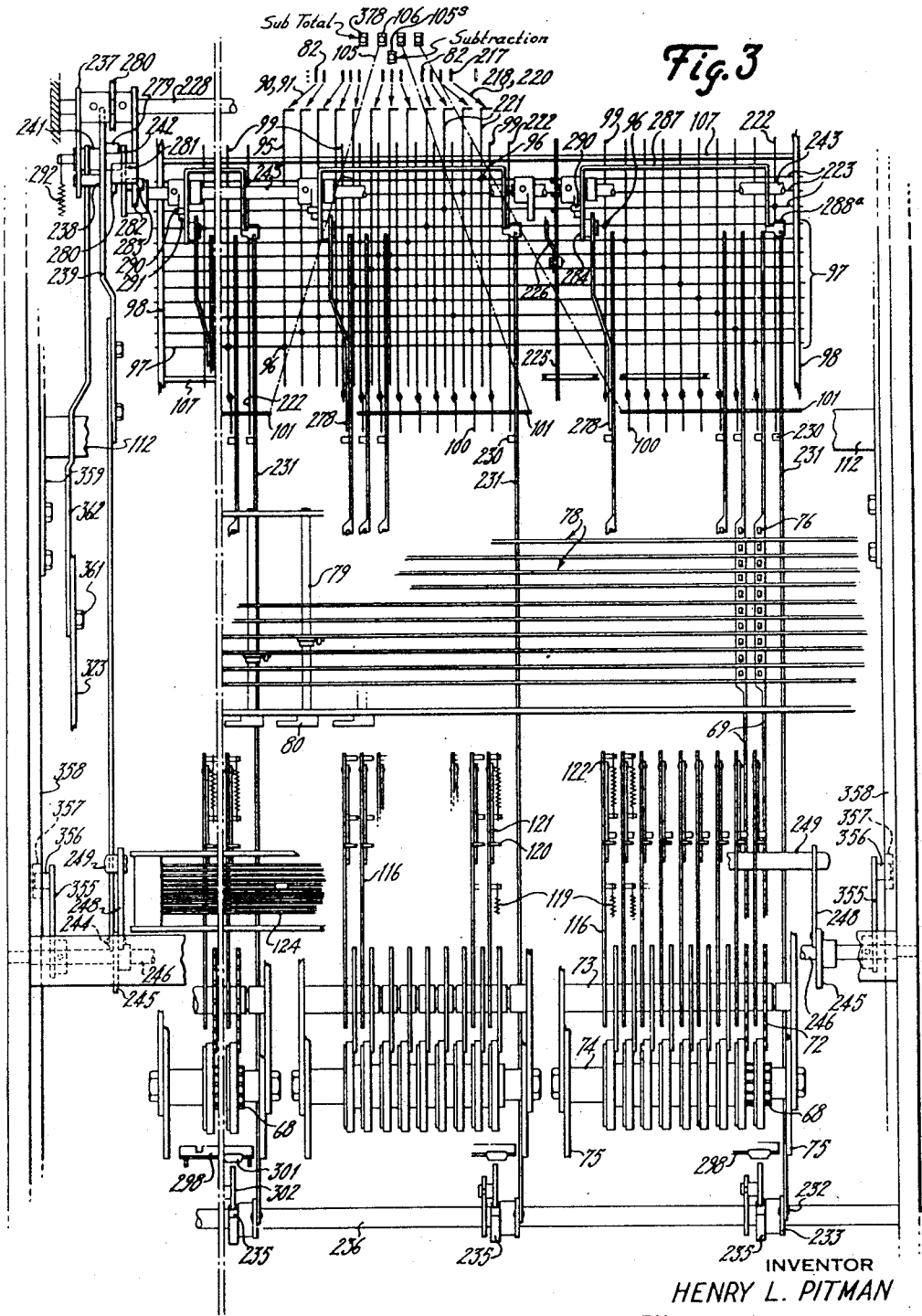

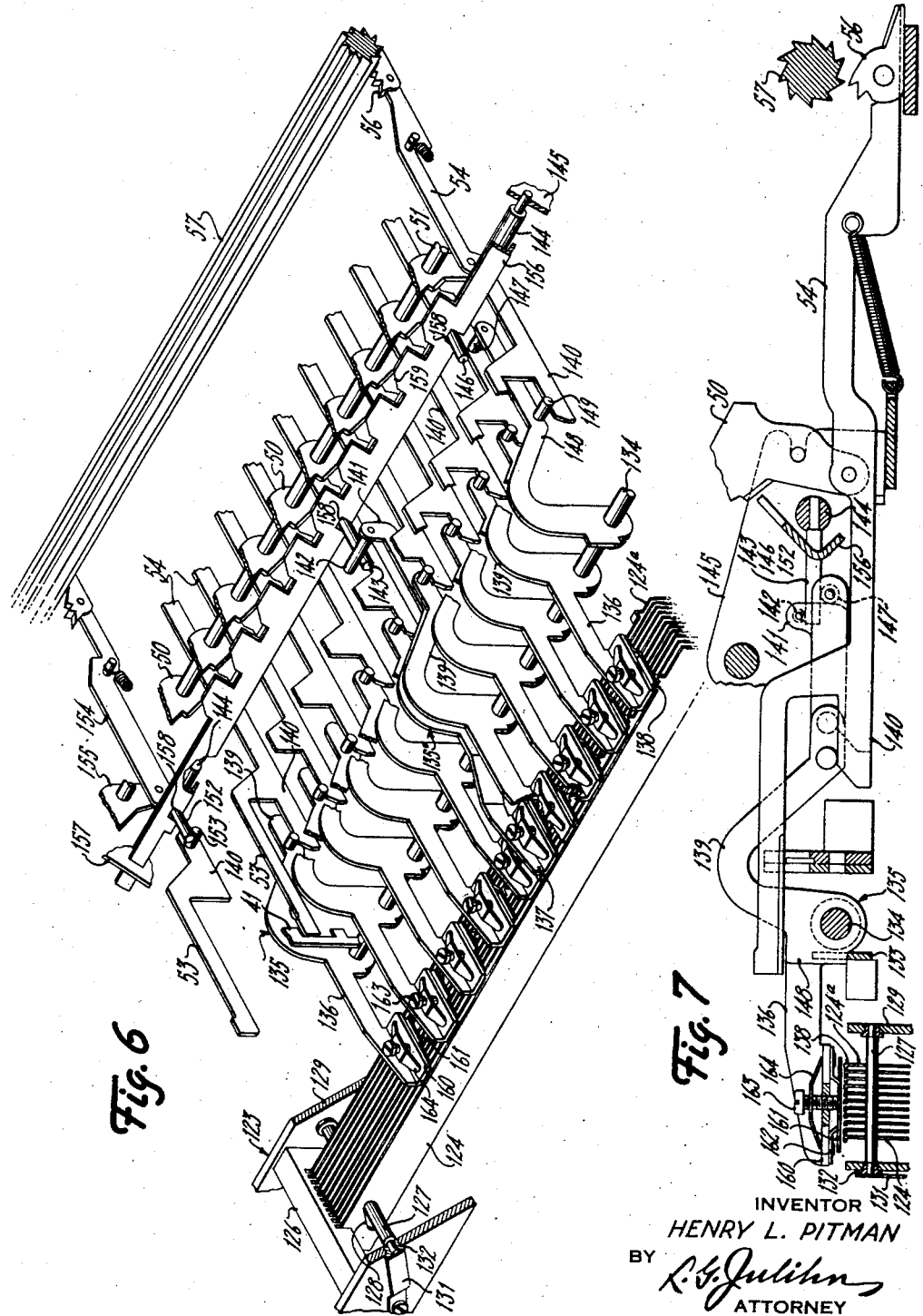

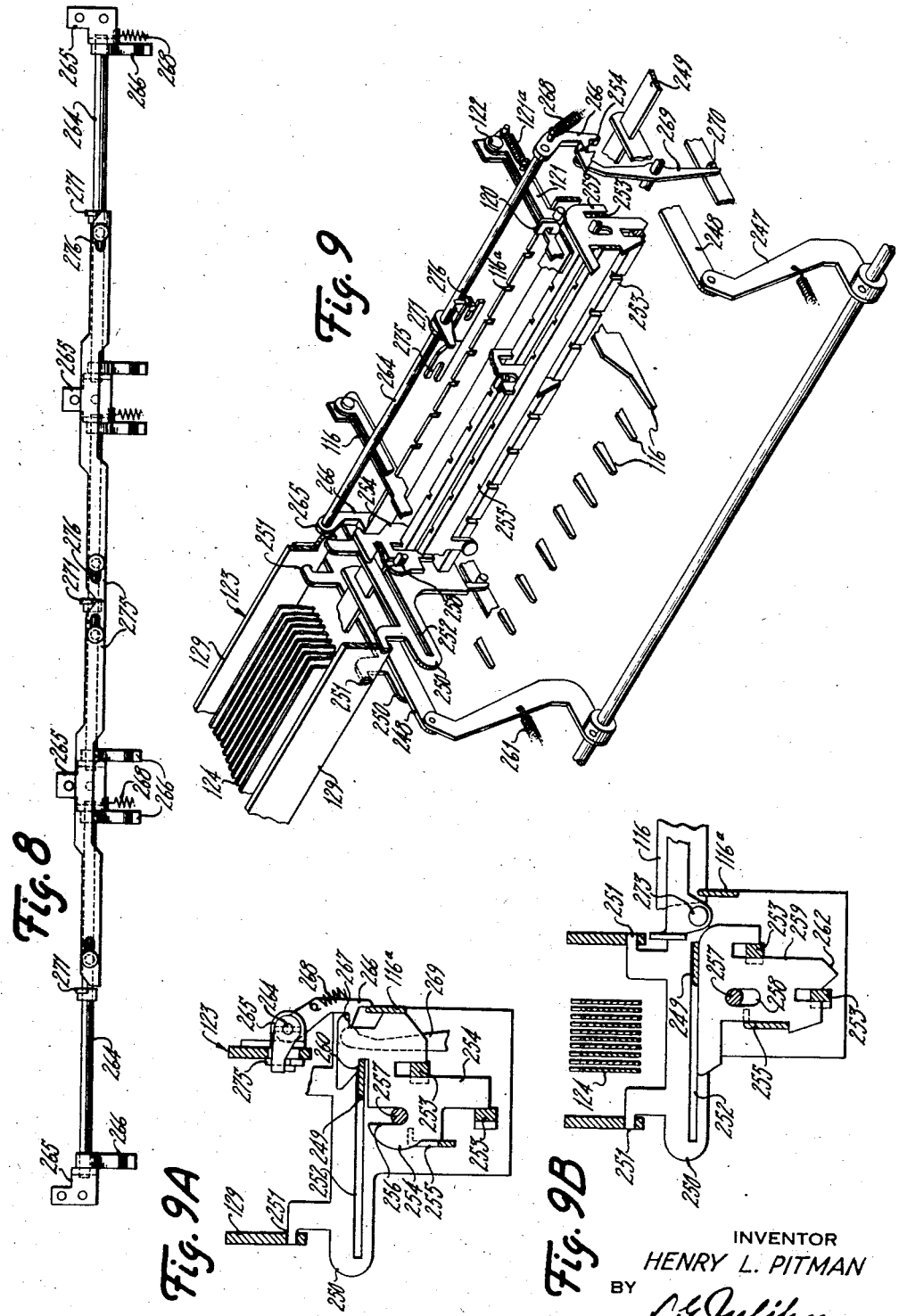

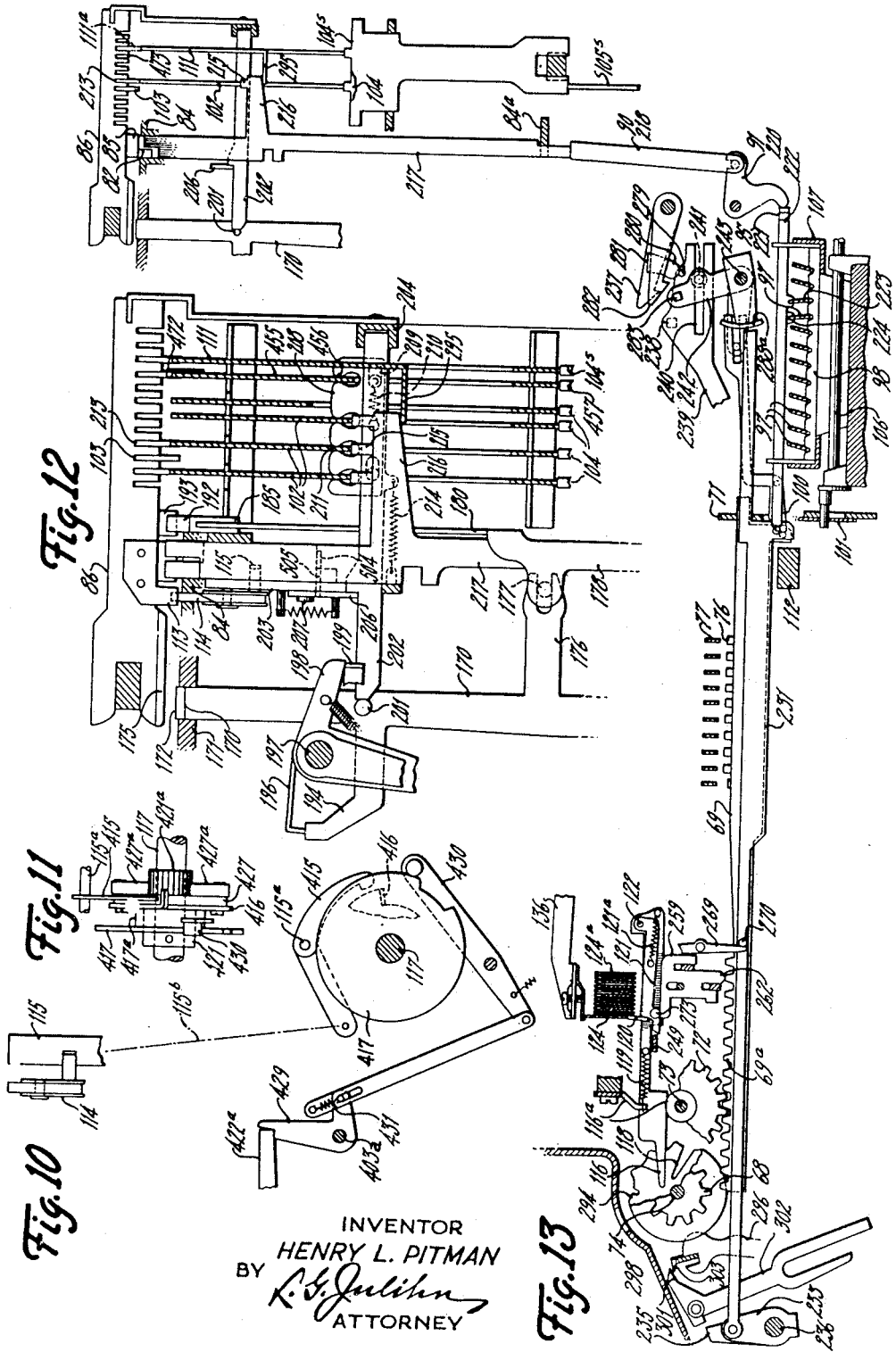

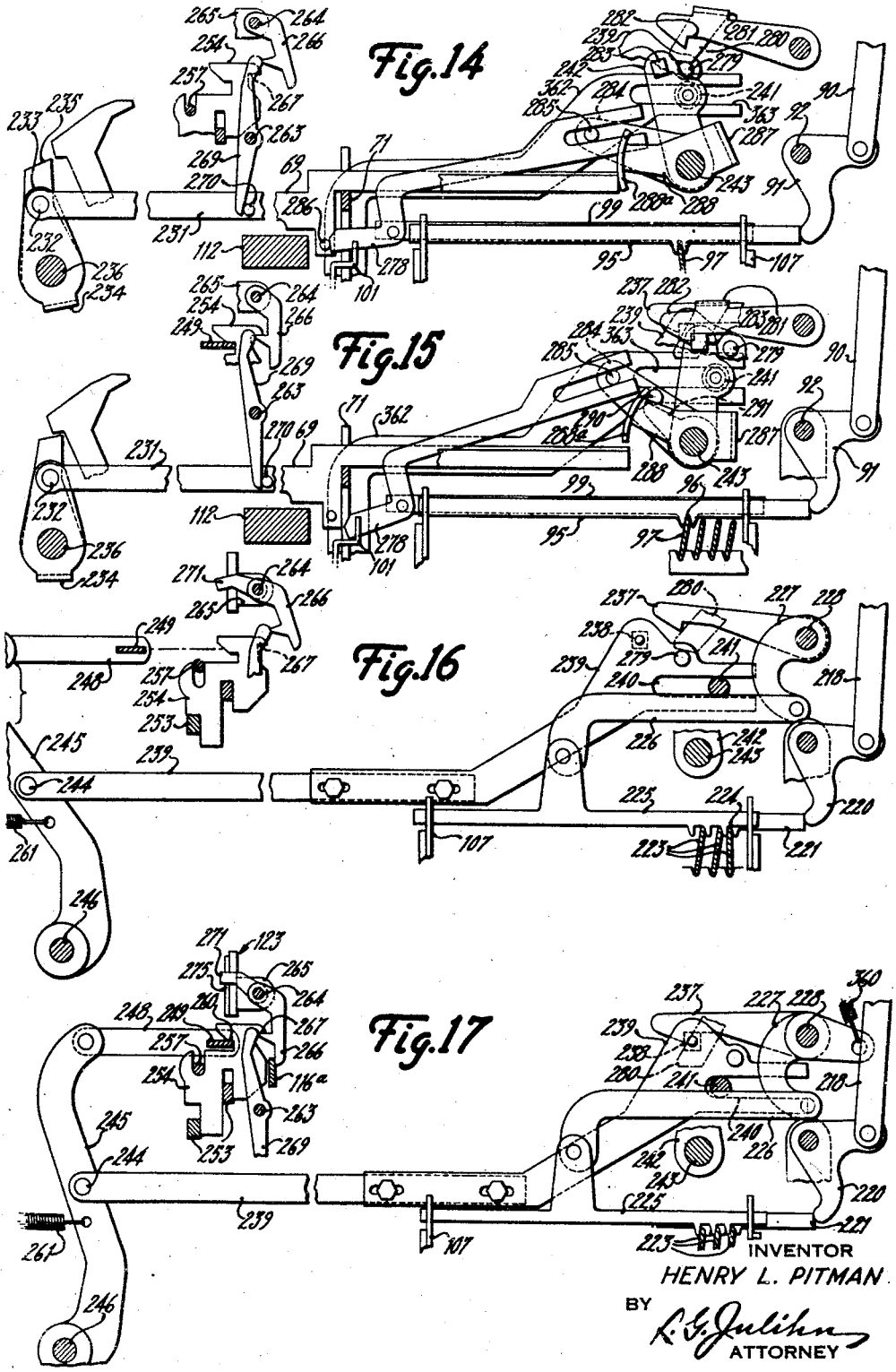

April 3, 1945.    H. L. PITMAN    2,372,681
COMBINED TYPEWRITING AND COMPUTING MACHINE
Filed May 27, 1940    13 Sheets-Sheet 8
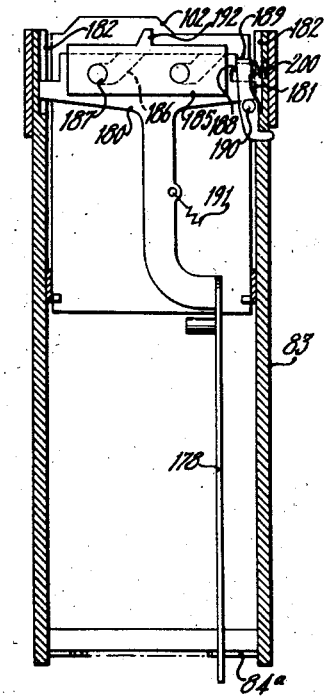
Fig. 18
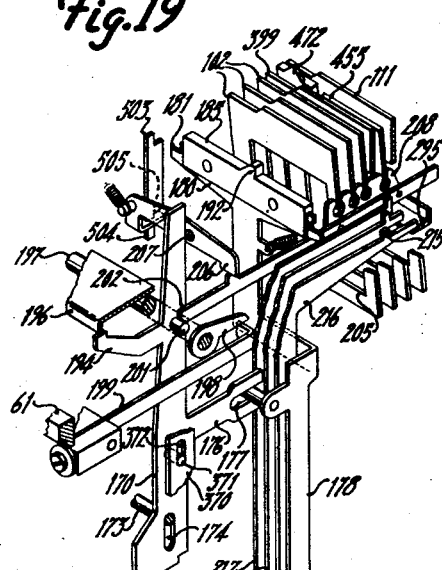
Fig. 19
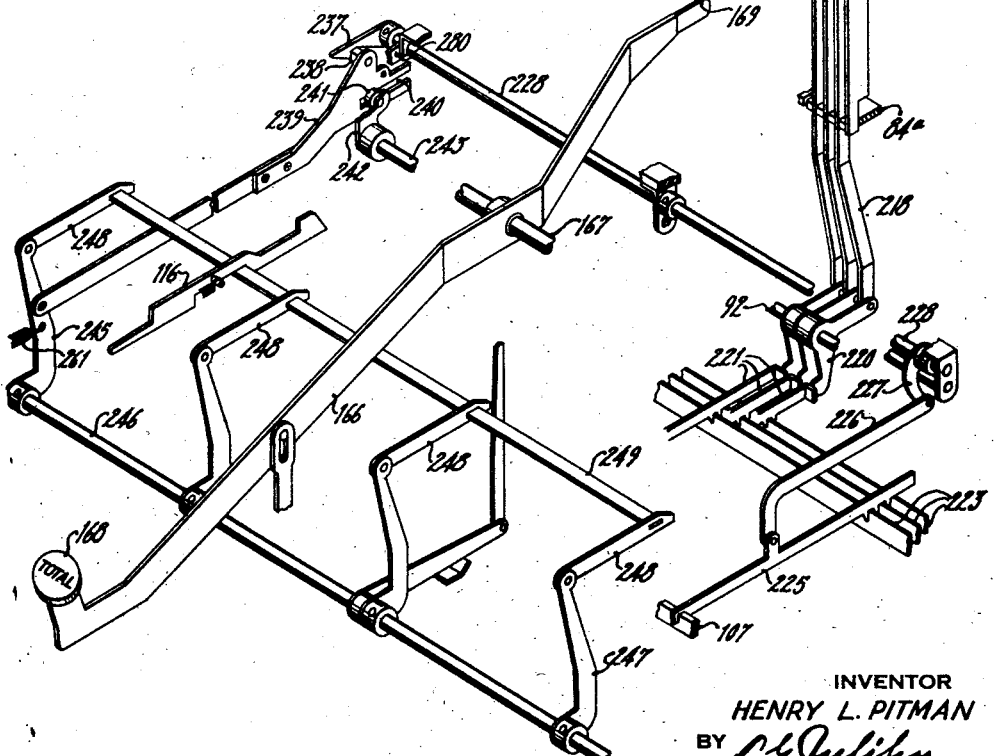
INVENTOR
HENRY L. PITMAN
BY
ATTORNEY April 3, 1945.   H. L. PITMAN   2,372,681
COMBINED TYPEWRITING AND COMPUTING MACHINE
Filed May 27, 1940    13 Sheets-Sheet 9
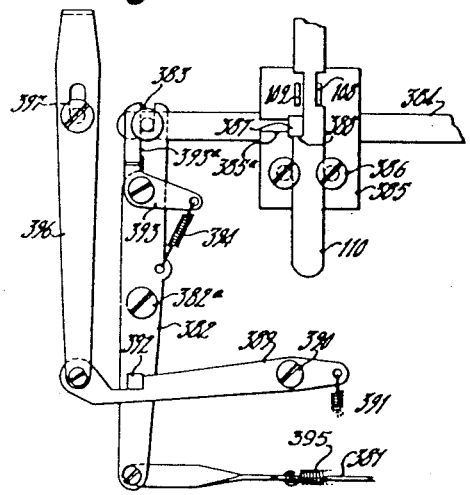
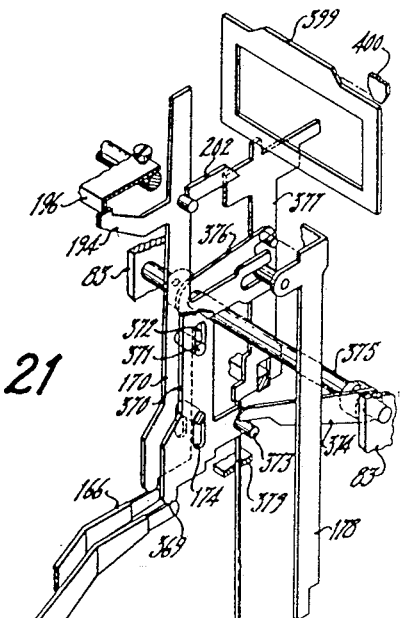
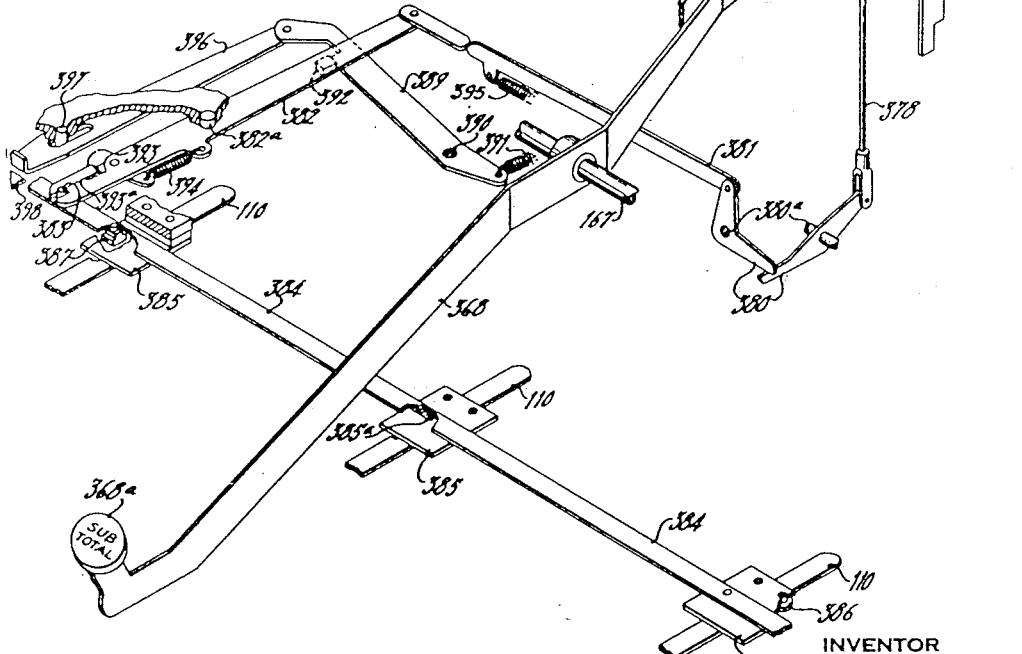
INVENTOR
HENRY L. PITMAN
BY
ATTORNEY

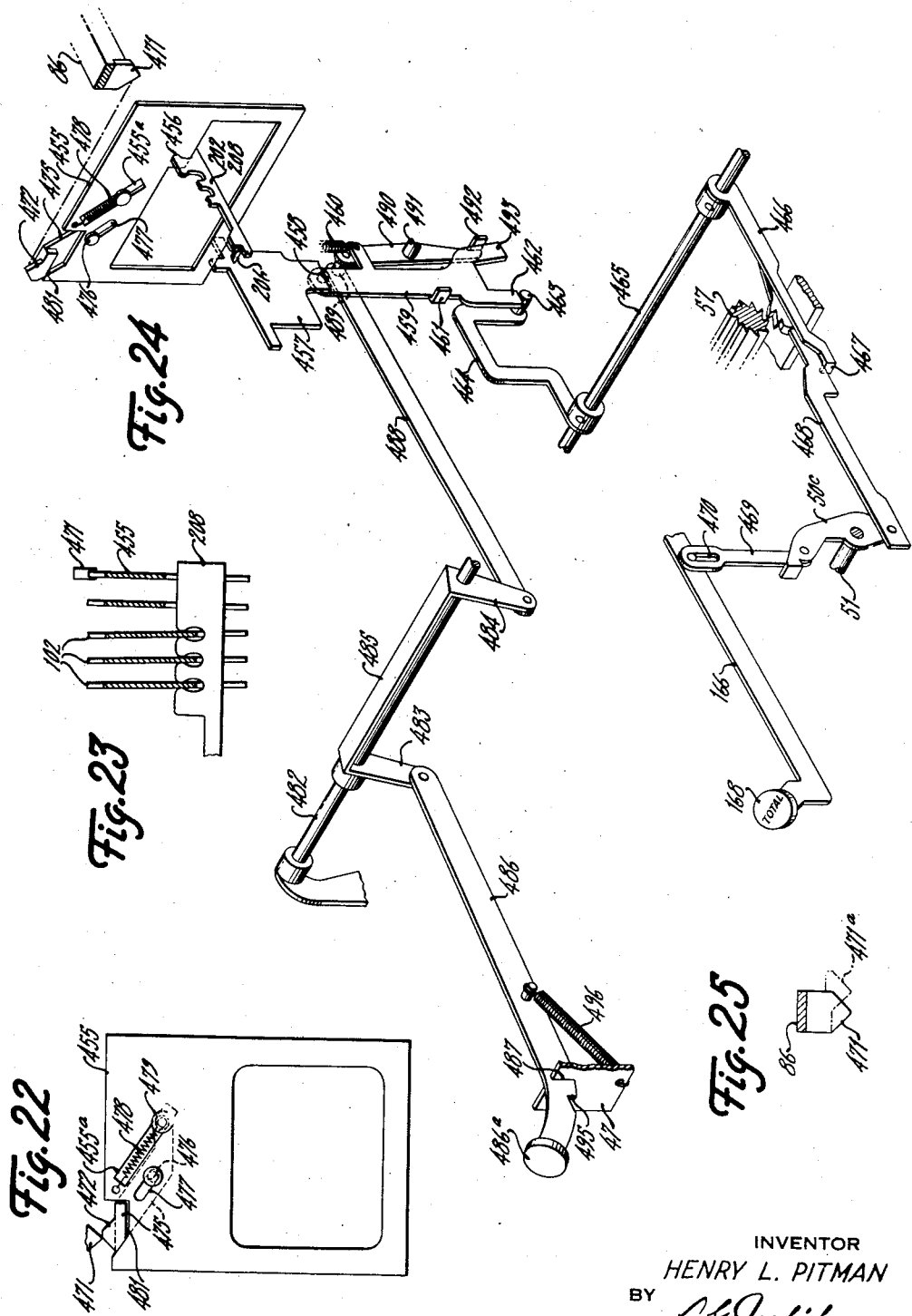

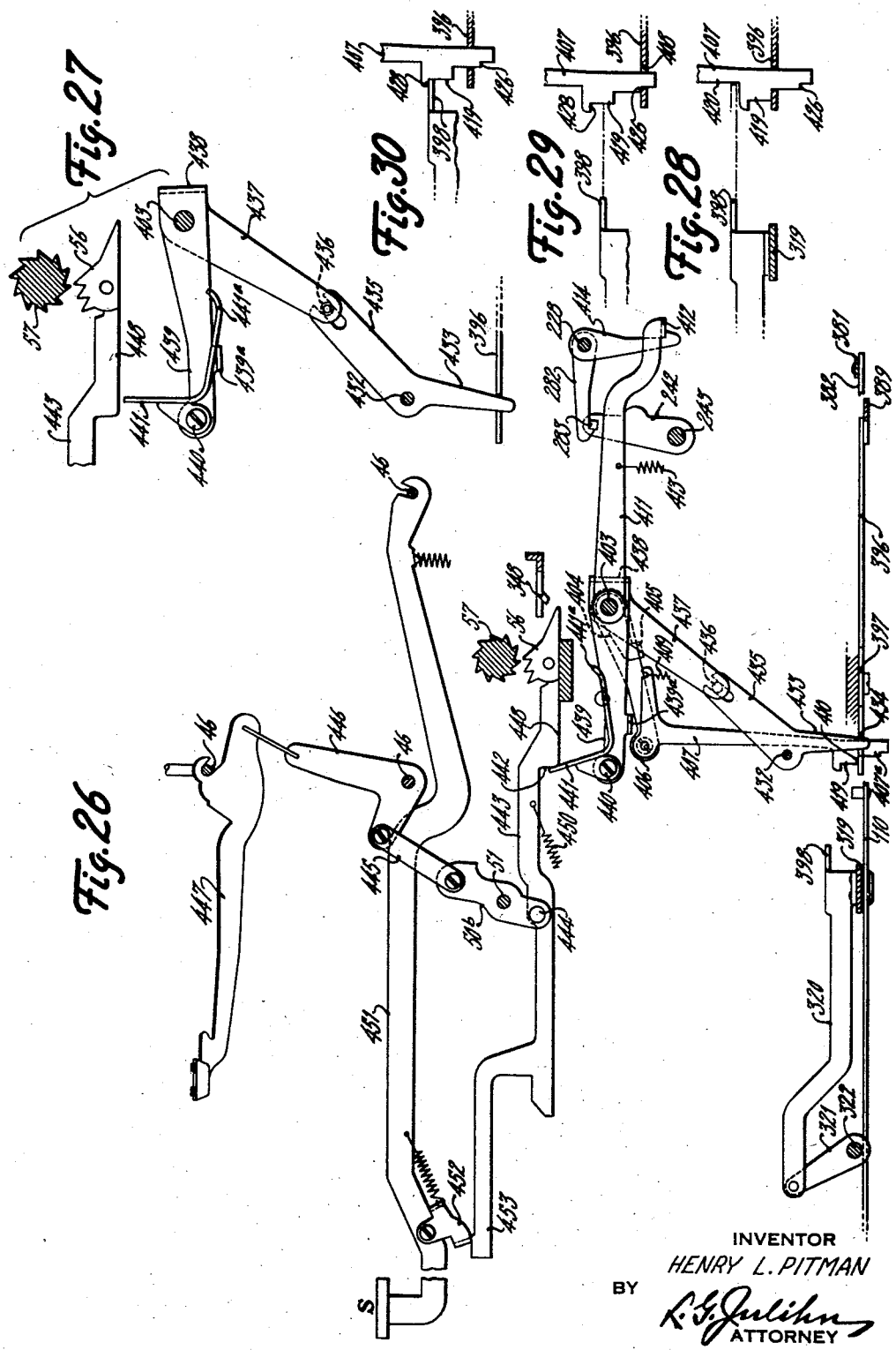

April 3, 1945.  H. L. PITMAN  2,372,681
COMBINED TYPEWRITING AND COMPUTING MACHINE
Filed May 27, 1940  13 Sheets-Sheet 12
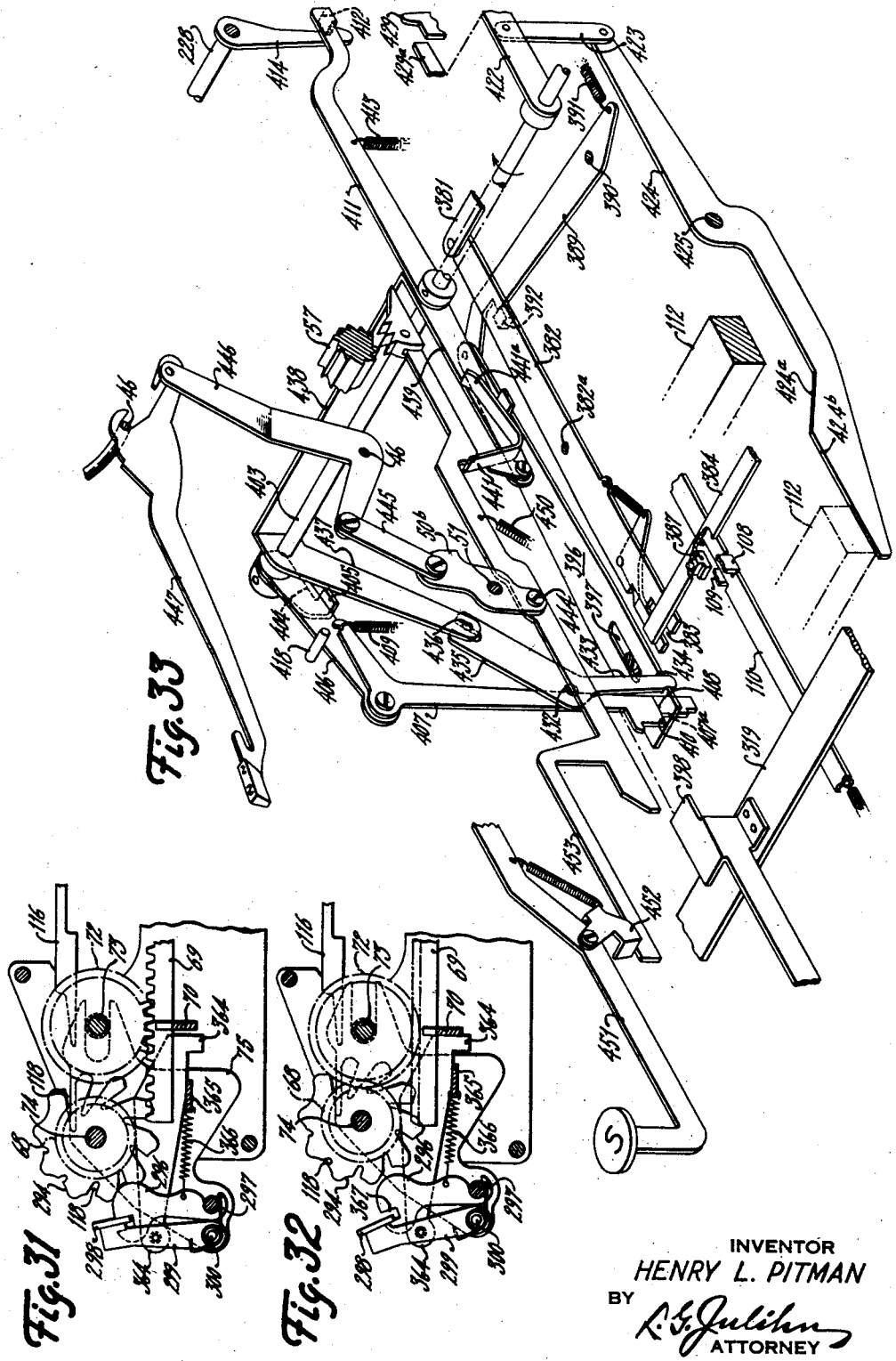
INVENTOR
HENRY L. PITMAN
BY
ATTORNEY April 3, 1945.  H. L. PITMAN  2,372,681
COMBINED TYPEWRITING AND COMPUTING MACHINE
Filed May 27, 1940  13 Sheets-Sheet 13

INVENTOR
HENRY L. PITMAN
BY
ATTORNEY

Patented Apr. 3, 1945

2,372,681

UNITED STATES PATENT OFFICE 2,372,681

COMBINED TYPEWRITING AND COMPUTING MACHINE

Henry L. Pitman, Hartford, Conn., assignor to Underwood Elliott Fisher Company, New York, N. Y., a corporation of Delaware Application May 27, 1940, Serial No. 337,380

23 Claims. (Cl. 235—60)

This invention relates to combined typewriting and computing machines and deals with automatically actuating typewriter mechanism for printing totals standing in registers.

The invention is herein illustratively embodied in a machine of the Underwood-Hanson class. In such machines, computing pinion actuators of different denominations are indexed through operation of numeral type actions of the typewriter, the typewriter carriage cooperating to select the actuators seriatim in denominational order for the indexing. The indexed actuators are subsequently cycled to run the indexed amount into computing wheels which thus accumulate totals. The machine may have a plurality of registers or sets of computing wheels.

The general object of the invention is to provide improved mechanism for automatically actuating the typewriter mechanism for total printing.

Another object is to provide for such automatic printing of a total from any one of the plurality of registers.

Another object is to have the typewriter carriage determine from which register the total is to be printed at one or another total printing zone of the carriage.

Another object is to print the total successively from each of several registers and moreover to have such succession of total printings progress automatically following a suitable initiatory operation.

Another object is to provide for suppressing at will the feature of automatic succession of total printings.

Another object is to effect automatically the printing of a clear sign as where the total printing involves clearing of the register, to indicate that such clearing has actually been effected.

Another object is to provide that if by some abnormality there is failure in clearing the register at total printing, such failure will become immediately manifest to the operator.

In subtotal printing the register is not cleared, that is, the subtotal is left standing in the register. Another object is to print automatically by means of the typewriter mechanism a sign indentifiable with the printed subtotal to indicate the latter as such.

A subtotal key may be provided and is operable manually to condition the machine for subtotal printing. Another object is to condition the machine automatically for the printing of a subtotal as where such subtotal printing occurs in a succession of total printings.

The invention is herein illustratively applied to total printing mechanism of the kind disclosed in my co-pending application, Serial No. 42,611, filed September 28, 1935, now Patent No. 2,258,-714, dated October 14, 1941, and in Pitman Patent No. 2,192,365, dated March 5, 1940.

The foregoing and other objects features and advantages will be understood from the following description with reference to the drawings, and from the novel combinations and features of construction embodying the invention as defined in the appended claims.

In the drawings:

Figure 1 is a side elevation of details of the clear sign printing mechanism.

Figure 2 is a cross sectional side elevation of a combined typewriting and computing machine embodying the invention.

Figure 3 is a top plan view of the computing base showing details and a diagram of the register selecting connections.

Figure 4 is a view from the underside of the computing base of details of clear sign printing connections.

Figure 5 is a perspective of the mechanism mainly in the computing base arranged as to register selection for total printing and clear sign printing.

Figure 6 is a perspective of mechanism for controlling operation of the numeral type actions for total printing.

Figure 7 is a cross sectional side view of Figure 6 mechanism.

Figure 8 is a front elevation of details of connections for confining total printing to one register.

Figure 9 is a skeleton perspective of details of total-reading and type-selecting mechanism.

Figures 9A and 9B are cross sectional side views showing details of the total-reading and type-selecting mechanism.

Figure 10 is a side view of connections for controlling cycling of the general operator.

Figure 11 is a fragmentary rear elevation of the cycling-clutch mechanism.

Figure 12 is an enlarged scale side view of the register-selecting and total-printing controls operable by the typing carriage.

Figure 13 is a cross sectional side view showing the operated position of parts involved in total reading and type selecting.

Figure 14 is a cross sectional side view of register-selecting and total-taking control parts in operated positions.

Figure 15 is a cross sectional side view showing the Figure 14 parts substantially in normal positions.

Figure 16 is a cross sectional side view of parts, supplementing the Figure 14 parts, in operated positions for register-selecting and total-printing control.

Figure 17 is a cross sectional side view showing the Figure 16 parts in normal positions.

Figure 18 is a cross sectional front elevation of tabulating stop mechanism involved in total printing.

Figure 19 is a skeleton perspective of total-printing and register-selecting controls including a total key.

Figure 20 is a plan view from below the computing base of details of mechanism employed for subtotal printing.

Figure 21 is a perspective of the mechanism employed for determining subtotal printing.

Figure 22 is a front elevation of a carriage operable control member.

Figure 23 is a cross sectional side view of carriage operable control members.

Figure 24 is a perspective of the mechanism involved in carriage controlled automatic operation of a total key.

Figure 25 is a front elevation of tappet means on the carriage.

Figure 26 is a cross sectional side view of the mechanism employed for printing a subtotal sign.

Figure 27 is a cross sectional side view showing parts of Figure 26 in operated position.

Figures 28, 29 and 30 are side view diagrams illustrating normal and operated stages of parts of Figure 26.

Figures 31 and 32 are cross sectional side views of the register mechanism and its clear sign printing controls, Figure 31 showing the parts in normal positions and Figure 32 showing the parts during a general operator cycle.

Figure 33 is a perspective of the mechanism controlling subtotal sign printing and subtotaling.

Typewriter mechanism

Figure 34:
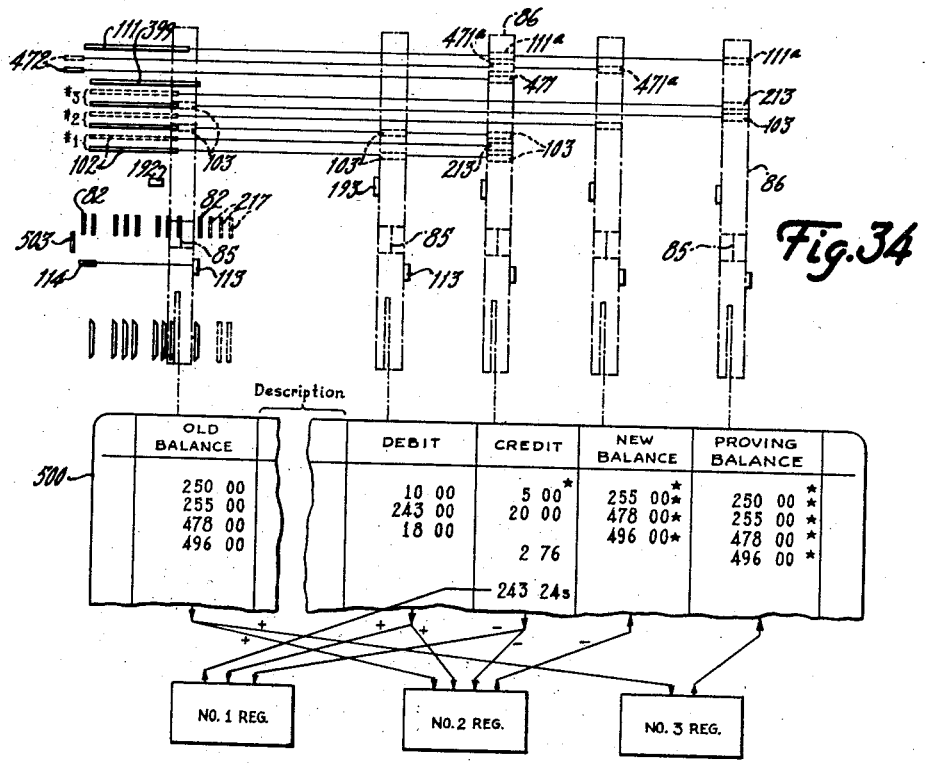
Figures 34 and 35 are diagrams illustrating carriage-control set-ups for different work sheet forms.

Numeral keys 40 have stems 41 vertically movable in guides, partly shown at 42, Figure 2. Each key 40 is for a corresponding numeral type action which comprises a type bar 43, an operating lever 44 and bell crank 45. these parts having fulcrums 46 in the framework. The levers 44 extend forwardly through a guide comb 47, and each is connected by a link 48 to a lever 50, the several levers 50 having a common fulcrum rod 51 in the framework. Each lever 50 has pivoted thereto at 52 a draw link 54 which is an arm of a lever having a forwardly extending arm 53 operatively connected as at 55 to a shoulder of a corresponding key stem 41. Depression of the key 41 rocks the draw link 54 counterclockwise about the pivot 52 to lift a toothed pawl 56 at the rear end of said link 54 into engagement with a continuously rotating power-driven toothed snatch roll 57 journaled in the framework. The power drive connections to the snatch roll 57 are not shown as these may be of any suitable form. The rotating snatch roll 57 draws the link 54 rearwardly to swing the corresponding type bar 43 upwardly and rearwardly to print against a platen 58, the draw link 54 operating through the described parts 50, 48, 45, and 44.

The platen 58 is in a typing carriage 59 movable laterally upon front and rear rails 60 on the typewriter frame. A letter-feed rack 61 on the carriage engages a pinion 62 of an escapement wheel 63 cooperative with escapement dogs 64 actuated by means of a universal bar 65 which is common to and actuatable by the type bars 43. A spring motor 66 moves the carriage in letter-feed direction at operation of the escapement devices.

Computing base

The computing base CB, Figure 2, is surmounted by the typewriter T. It contains laterally spaced sets of computing pinions 68, each set forming a totalizer. Laterally spaced sets of actuators or register bars 69 for the computing pinions are slidably guided in front and rear combs 70, 71 in the computing base framework. Each set of register bars 69 has permanently meshed with its racks 69ª a set of idlers 72 rotatable on a fixed shaft 73 in the framework. Each set of computing pinions 68 normally stands disengaged from its racks 69ª and idlers 72. Each set of pinions 68 turns on a shaft 74 mounted between side plates 75 forming a frame with which the set of pinions is movable downwardly to mesh directly with the racks 69ª, 69, for addition, or rearwardly to mesh with the idlers 72 for subtraction.

Each register bar 69 has digit pins 76 from "0" to "9." All the "0" pins, the first from the left of Figure 2, are normally depressed. Each register bar 69 is normally shouldered against the rear guide 71 by a spring 76ª but is slightly advanceable from the Figure 2 position to bring its pins underneath corresponding pin-setting bars 77 of pin-setting linkages 78. Each pin-setting linkage includes a rock-shaft 79 having a horizontal crank arm 80 which is engageable by a rod 81 pivoted to and pendent from a corresponding numeral type action lever 44.

Carriage control of register bars

Denominational jack rods 82 are slidably supported for vertical movement in upper and lower guide combs 84 and 84ª, Figure 13, in a housing 83 fixed to the back of the typewriter, Figure 2. The upper ends of the jacks 82 are engageable by a tappet 85 presented by a column unit 86. There may be a column unit 86 for each computing zone traversed by the carriage 59. The units 86 are adjustable along the carriage in a rack frame diagrammatically represented at 87 and supported by carriage brackets 88. The units 86 traverse a supporting track 89 attached to the housing 83. The lower ends of the jacks 82 abut connecting rods 90 pivoted to bell cranks 91 having a fulcrum rod 92 carried between side arms 93 fixed on a rock-shaft 94 in the computing base. The bell cranks 91 abut master racks 95 which are connected as at 96, Figures 2 and 3, to transverse blades 97 rockable about their lower edges in notches of supporting bars 98 in the framework. The transverse blades 97 have connected thereto as at 96 sets of distributive racks 99 each of which has pivoted thereto a coupler 100, there being a set of said racks 99 and couplers 100 for each set of register bars 69. Each set of couplers 100 is liftable by means of a plate 101, under control of the carriage 59, to connect its distributive racks 99 to a corresponding set of register bars 69. For each set of couplers 100 there is a cam plate 102 movable edgewise vertically in the housing 83. The cam plates 102 are selectively depressible by tappets 103 presented by the column units 86 on the carriage, each column unit being thus adapted to depress one or more of the cam plates 102 according to a predetermined register-selecting plan. By its depression, a cam plate 102 works through an intermediate plate 104, guided in the housing 83 for vertical edgewise movement, and through connections 105 to a rock-shaft 106 journaled in the computing base, to raise the corresponding coupler-lifting plate 101 and thereby raise the couplers 100 into operative connection with the corresponding set of register bars 69. Thus by means of its corresponding cam plate 102 any of the several sets of register bars is connectible to the transverse blades 97 and hence to the series of denominational jacks 82. In the present machine, there are nine computing pinions 68 and nine register bars 69 in a set so that each register has nine denominations. Correspondingly, there are nine of the denominational jacks 82 and nine corresponding transverse blades 97, the latter being indicated within the bracket 97 in Figures 2 and 3 to distinguish them from three other similar blades 223 to be described later. The racks 95, 99 are slidably guided at their ends in a frame 107 fixed to the framework. Springs, not shown, applied to the racks 95 hold the latter, the racks 99 and the blades 97 in their normal positions in which the blades 97 abut stops, not shown, in said frame 107. Said frame 107 includes the blade supporting bars 98.

*State control*

Depression of a cam plate 102 to lift a coupler plate 101 also operates to lift a latch 108, partly shown, Figures 2, 20 and 33, which is operatively connected to said plate 101. Said latch 108 is lifted from and thereby releases a spring-pressed state controller bar 110 which is similar to the state controller in the Pitman Patent No. 2,160,487, dated May 30, 1939, which also shows suitable connections for lifting the latch 108. Movement of the state controller bar 110 consequent to its release is forwardly and is limited by a secondary latch 109 to determine connection of the corresponding set of computing pinions 68 to the general operator mechanism in such way that during a cycle of the latter, said set of pinions is shifted for direct connection to the register racks 69ᵃ for addition. There is a state controller mechanism for each register. A column unit 86 may have an additional tappet 111ᵃ, to depress a corresponding cam plate 111. The depression of cam plate 111 is effective through connections, including and diagrammatically represented, Figure 13, by an intermediate plate 104ᵃ, similar to 104, and a thrust rod 105ᵃ, to lift the secondary latch 109 to effect a further shift of the state controller bar 110. Further details, not shown, of such subtraction connections may be substantially as shown in Pitman Patent No. 2,091,717, dated August 31, 1937. This further shift of the bar 110 determines connection of the corresponding set of computing wheels 68 to the general operator mechanism in such way that said set of pinions is directly connected to the idlers 72 for subtraction, during a cycle of the general operator mechanism.

*General operator*

A cross bar 112 extends transversely of all the register bars 69 and forms part of a general operator mechanism such as that shown in the aforesaid Patent 2,160,487. The general operator mechanism is cycled by power and a cycle may be initiated automatically by the carriage as the latter leaves a computing zone. For this purpose each column unit 86, Figure 12, may have a cycling tooth 113 to engage a cycle trip lever 114, pivoted on the housing 83 and thus depress a jack 115 to rock a cycle-tripping shaft 115ᵃ by means of connections diagrammatically represented at 115ᵇ, Figure 10. The cycle initiating means are more fully shown in the aforesaid Patent 2,160,487. In the cycle the general operator cross bar 112 is reciprocated forward and back by means of a cycling shaft 117 and thereby reciprocates those register bars in which any digit pins 76, from "1" to "9," have been set. Correspondingly, the computing pinions 68 will be rotated additively or subtractively according to their above-referred-to manner of connection to the general operator mechanism. The drive, not shown, from cycling shaft 117 to cross bar 112 may be as shown in Pitman Patent No. 2,178,702, dated November 7, 1939.

*Entering amounts*

At operation of the numeral type actions, by means of the power snatch roll 57, under control of the numeral keys 40 for typing and computing an amount, the carriage 59 traverses a computing zone for which a corresponding column unit 86 will have been placed on the carriage. This unit 86 will have, besides the denomination selecting tappet 85 for traversing the jacks 82, one or more register selecting tappets 103 which will have operated to depress a corresponding cam plate or plates 102 preparatory to traverse of the jacks 82 by their tappet 85. Each depressed cam plate 102 is effective, through the corresponding set of couplers 100, to connect a corresponding set of register bars 69 to said jacks 82. As the jacks 82 are depressed seriatim at the traverse by the carriage of the computing zone at operation of the numeral type actions, the type actions operate through the rods 81 and pin-setting linkages 78 to depress corresponding digit pins 76 in the register bars 69 that are advanced to indexing position under said linkages by the depression of the jacks 82. As the carriage leaves the computing zone following the typing and entering of the last figure of the amount, the cycling tooth 113 of the column unit 86 engages the cycle trip lever 114 to cause a cycle of the general operator mechanism to cycle the indexed register bars and thereby run the indexed amount into one or more sets of computing pinions 68. If the indexed amount is to be run into the computing wheels subtractively, the column unit 86 will have a tappet 111ᵃ to depress the subtraction cam plate 111. Carryover devices, not shown, may effect extra carryover steps of register bars 69 beyond the advance of cross bar 112 as exemplified in said Patent No. 2,192,365.

*Total reading and type selecting mechanism*

For each set of computing pinions 68 there is provided a set of feelers 116, each in the form of an elongate bar slidably mounted in guides 116ᵃ, Figures 2 and 9, on the framework. Each computing pinion 68 has fixed thereto a disk having slots 118 of different feeler-stopping depths representing the different digital or angular positions of said computing pinion. A spring 119 is connected to each feeler 116 for moving it to a stopped position, determined by one of the slots 118 in the disk, upon release of the set of feelers from restraining means as will be described later, all the feelers normally standing disengaged from their respective slotted disks as in Figure 2. Each feeler carries a type selector in the form of a tab 120 bent laterally from an arm 121 pivoted to the feeler at 122. Each arm 121 is urged counterclockwise by a spring 121ᵃ, Figure 9, anchored to the feeler, to a normal position in which the bottom edge of the tab 120 may abut the underlying edge of the feeler 116.

Extending transversely above the selectors 120 associated with the several sets of feelers 116 is a set of ten blades 124 corresponding to the digits "0" to "9." The blades 124 are guided in a frame 123, Figures 3, 6, 7 and 9 for up-and-down edgewise movement. Said frame is fixed in the computing base framework and comprises slotted guides 126 at the ends of the blades for spacing the blades facewise, and cross pins 127 passing through oblique slots 128 in the ends of the blades. The ends of the pins 127 are reduced in diameter and are journaled in cross members 129 of the frame so that the pins may roll freely with the oblique up-and-down movements of the blades. The arrangement is such that a spring clip 131 and a removable bushing 132 removably holds each pin in the frame. The blades 124 are spaced facewise apart in accordance with the different positions assumed by a selector 120 as its feeler 116 is stopped in one or another of the computing pinion notches 118. By means which will later be described, each selector 120 is lifted by turning its arm 121 about the pivot 122. The lifting of a selector 120 lifts the blade 124 under which the selector is positioned by means of the computing pinion slot 118. A fulcrum rod 134 in the typewriter frame mounts levers 135, one for each of the type actions from "1" to "9," Figures 2, 6 and 7. Arms 136 of said levers extend over the blades 124 and are spaced laterally by a guide comb 133. An additional lever 135⁰ serves both for the "0" type action and the typewriter spacer action as will later appear and has an arm 137 engaged by the blade 124 corresponding to "0." Each of the blades 124 has an upwardly extending tab 138, Figures 6 and 7, whereby it may engage only the corresponding one of the levers 135, 135⁰. Rearwardly extending arms 139 of the levers 135 have each a lateral pin for engaging an arm 140 of the draw link 54 of the corresponding type action. The other lever 135⁰ has an arm 141 having a pin 142 for engaging a pin 143 fixed in a rock-shaft 144 having reduced ends journaled in brackets 145 of the framework. Said rock-shaft 144 has another pin 146 for engaging a stud 147 of a lever 148 fulcrumed on the rod 134. Said lever 148 has another stud 149 for engaging the arm 140 of the draw link 54 for the "0" type action. Another pin 152 fixed to said rock-shaft 144 engages a stud 153 of the arm 140 of a draw link 154, Figure 6, which may be connected by means of suitable connections to the rocker for the typewriter escapement dogs 64 as exemplified in the aforesaid Patent No. 2,192,365. Such connection is diagrammatically represented by the partly shown lever 155, fulcrumed on the rod 51 to which the draw link 154 is pivoted similarly to the pivoting of the draw links 54 to the levers 50.

An angle bar 156 is slidably supported at its ends in brackets 157, of which only one is shown, Figure 6, for endwise shifts in opposite directions. The angle bar is notched as at 158 to engage the pins of the rock-shaft 144 for connecting said rock-shaft to shift endwise with said angle bar 156. The rock-shaft 144 is shiftable for connecting either its pin 152 to the pin 153 of the spacer draw link 154 or to connect its pin 146 to the pin 147 of the lever 148 for the "0" type action draw link 54. Normally the rock-shaft 144 is in the Figure 6 position to connect it to the spacer draw link 154. Upon operation of any numeral type action from "1" to "9," the lever 50 thereof engages a cam bevel 159 of the angle bar 156 and thereby shifts it and the rock-shaft 144 rightwardly to connect said rock-shaft to the lever 148 for the "0" type action. The normal position, Figure 6, of the rock-shaft 144 obtains for spacing the typewriter carriage automatically from the highest denomination of a total-printing zone to the denomination in which the first significant figure of the total appears as where the total is of a less number of denominations than the number of denominations of the total-printing zone. The automatic carriage spacing is substantially as set forth in the aforesaid Patent No. 2,192,365 and need not be further described here.

Each of the arms 136, 137 has a horizontal plate 160 on the underside of which a leaf spring 161 is riveted as at 162 to contact the tab 138 of the corresponding blade 124. Some of the springs 161 may extend forwardly from the rivets to contact the front blades 124 and the other springs may extend oppositely to contact the rear blades 124 as indicated in Figures 6 and 7. An adjusting screw 163 is threaded in each plate 160 to bear on the spring 161. A spring 164 reacts between the upper surface of the plate 160 and the screw 163 to hold the latter frictionally in its adjustment. The screws 163 and cooperating springs 161 thus serve to finely adjust the contact connection between the arms 136, 141 and blades 124 and the screws may be conveniently regulated after the machine is assembled by means of a screw driver which may be introduced between alphabet type key levers 165, Figure 2, of the typewriter. Another blade 124ᵃ, Figures 6 and 7, is for controlling case shift mechanism in printing an overdraft total as set forth in the aforesaid Patent No. 2,192,365.

*Total key controlled carriage tabulating*

A total key lever 166, Figures 2, 19 and 21, has a fulcrum rod 167 in the typewriter frame and has a total key 168 at the typewriter keyboard. Said key lever engages, at 169, a vertical reed 170 guided at its upper end in a slotted fixture 171, Figure 2, on the typewriter frame, which similarly guides denominational tabulating stop reeds 172. A rod 173 in said fixture passes through slots 174 in the reeds to guide them at their lower ends which are guided laterally in lower slots of the fixture. A stop 175 on the column unit 86 may cooperate with any denominational reed 172 that is lifted by means of a denominational tabulating key lever, not shown but similar to the total key lever 166. The total key operated reed 170 is shorter than the reeds 172, Figure 12, so that it is not projectible into the path of the stop 175. Said reed 170 has a rearwardly extending arm 176 having a pin-and-slot connection 177 to a stem 178 guided in the comb 84ᵃ in the housing 83. An upper transverse plate 180 on said stem 178 has side ears 181 guided in vertical slots 182, Figure 18, of the housing 83. A bar 185 is longitudinally channeled on its underside to slidably fit over the plate 180, the latter having angular slots 186 opening into its upper edge for the introduction of transverse pins 187 in the channel of the bar 185. The slots 186 are elongated horizontally to retain the bar by means of the pins and to permit lateral movement of the bar relatively to the plate. When the plate 180 is raised, by depression of the total key 168, a latching shoulder 188 thereof, Figure 18, is drawn over a spring-pressed latch 189 pivoted at 190 in the housing 83. For this purpose the plate 180 is capable of slight lateral movement in its guide slots 182, and it is urged rightward, to draw its shoulder 188 over the latch 189, by a spring 191 pulling downwardly and rightwardly. A counter-stop tooth 192 on the bar 185 is thus placeable, through lifting of the plate 180, into the path of a tooth 193 on the column unit 86. The total-key-lifted reed 170 has, similarly to the denominational reeds 172, an arm 194 to engage a universal bar 196 fixed to a rock-shaft 197 journaled in the fixture 171. Thus when said reed 170 is lifted, the rock-shaft 197 operates through an arm 198 thereupon to rock a lever 199, pivoted on the fixture 171, to lift the letter-feed rack 61 from the escapement pinion 62 to release the carriage for consequent movement by the spring motor 66 in tabulating direction. The carriage tabulating movement is terminated when the column unit tooth 193 strikes the tooth 192 of the bar 185 and thereby moves said bar, together with the plate 180, leftwardly to release it from the latch 189 for consequent downward restoration by the spring 191. At such restoration, the reed 170 is also restored thereby permitting the rack 61 to reengage the escapement pinion 62 for finally settling the carriage in the tabulated-to position. The arrangement is such that said carriage is tabulated to the highest denomination place of the total printing zone. By having the plate 180 latched in its upper position by the latch 189, it is unnecessary to keep the total key lever 166 manually depressed to retain said position. The carriage is usually returned by power in this type of machine. Should the bar 185 and its tooth 192 be in upwardly projected position at such return of the carriage, an encounter of the column unit tooth 193 with the tooth 192 can result in no damage to the parts because in such case the tooth 193 will move the bar rightwardly relatively to the plate 180. Thereby the bar 185 will engage and rock the latch 189 clockwise of Figure 18 to withdraw it from the shoulder 187 of the plate 180 so that the latter and the bar 185 are restored downwardly automatically by the spring 191 thereby permitting the carriage-return movement to proceed. After such restoration of the plate 180, a latch spring 200 rocks the latch 189 counterclockwise again and restores the bar 185 leftwardly relatively to the plate 180. It will be seen that the left side of the tooth 192 is slanted so that the encounter of the carriage tooth 193 therewith tends to cam the bar 185 and plate 180 downwardly to facilitate their downward restoration.

Mechanism responsive to the total key to enable the carriage to control total printing At elevation of the total-key-operated reed 170, a stud 201 thereon, Figures 2, 12, 13 and 19, engaging a cam-beveled end of a rod 202, slidably guided in a slotted plate 203 and in a socket 204 of the housing 83, thrusts said rod endwise rearwardly to a position in which it is caught by a spring-pressed latch 206 pivoted to the plate 203 at 207. Said latch 206 serves to retain said rod 202 in said position even though the reed 170 becomes restored downwardly, together with the plate 180, consequently to the arrest of the carriage by the tooth 192 associated with said plate. A comb 208 is slidably mounted upon the rod 202 by pin-and-slot connections 209 and is yieldably connected to said rod by a spring 210. Said rod 202 and comb 208 are within openings 205 of the register selecting cam plates 102 so that the comb 208 is articulated as at 211 to each of said cam plates 102. Said cam plates are capable of rearward and forward tilting movement about their lower guide combs 212 in the housing 83. Thus upon rearward movement of the thrust rod 202, the upper cam edges of the cam plates which are normally aligned with the positions for the register-selecting tappets 103 of the column unit 86 are shifted rearwardly to align said cam edges with positions provided for a total-taking-control tappet 213 in the column unit 86. One such tappet 213 may be located on the unit 86 for a total printing zone of of the carriage to coact with that cam plate 102 which corresponds to the register from which a total is to be printed at that zone. Following the printing of the total the carriage trips the latch 206, as will be described later for resulting forward movement of the rod 202 by a spring 214. This rocks the plates 102 forwardly to their normal, Figure 2, position.

When, through operation of the total-key-lever 166, the cam plates 102 have been shifted to the positions, Figure 12, wherein one or another cam plate may coact with a corresponding total-taking-control tappet 213, thhe upper edges of the openings 205 of said cam plates 102 are positioned over upwardly extending tabs 215 of arms 216 extending rearwardly from jacks 217. There is a corresponding jack 217 for each cam plate 102 and in the normal positions, Figure 2, of the cam plates 102, the latter are clear of said tabs 215. Thus, the total-key-effected shift of the cam plates 102 to the positions, Figure 12, connects the cam plates 102 operatively to said jacks 217. Said jacks 217 are vertically guided in the combs 84, 84ᵃ that also guide the denominational jacks 82, the latter being to the left of said jacks 217 as in Figure 34. There are three of the jacks 217 in the present machine, one for each of the three registers. The jacks 217 are shorter than the denominational jacks 82 so that they are out of the path of the denomination-selecting tappet 85. Each jack 217 abuts a thrust rod 218 pivoted to a bell crank 220 fulcrumed on the rod 92. Each bell crank 220 abuts a rack 221 that is slidably supported like the denominational master racks 95. The three racks 221 are articulated respectively to corresponding transverse blades 223, Figures 3, 5, 13, 16, 17, that are similar to the denominational blades 97 and are rockable about their lower edges in the notched blade-supporting bars 98. The blades 223 are connected as at 224, Figure 16, to a common rack 225 slidably supported in the frame 107. Said rack 225 is connected by a link 226 to an arm 227 fixed to a transverse rock-shaft 228 journaled in brackets 229 in the computing base framework.

Each blade 223 is also connected as at 219, Figure 5, to a corresponding rack 222 slidably supported in the frame 107, Figure 2.

Each rack 222 has its forward end opposite a stud 230 of a bar 231 that is slidably guided at its rear end portion in the rear guide comb 71 for the companion set of register bars 69, Figure 13, there being one of said bars 231 for each register. Each bar 231 extends forwardly for pivotal connection as at 232, Figures 3 and 5, to an arm 233 connected by a spacing yoke 234 to a latch pawl 235. The yoked arm 233 and pawl 235 are loosely fulcrums on a transverse rock-shaft 236 in the computing base framework. The pawls 235 and associated bars 231 relate to clear sign printing mechanism as will hereinafter be described.

The above-mentioned rock-shaft 228 has fixed thereto a latch arm 237 normally engaging over a square stud 238 on a link 239, Figures 3, 5 and 17. By means of a slot 240 therein, said link 239 is slidably guided at its rear end in a groove of a stud 241 on an arm 242 fixed to a transverse rock-shaft 243 journaled in the computing base framework. The forward end of said link 239 is pivoted at 244 to a lever 245 fixed to a transverse rock-shaft 246 journaled in the computing base framework. Said lever 245, and similarly formed arms 247 on shaft 246, Figure 19, are each connected by a link 248 to a transverse restoring bar 249 associated with the several sets of feelers 116.

Associated with each set of total-reading feelers 116 there are right and left plates 250 having supporting connections 251 to the cross members 129 of the supporting frame 123, Figure 9. Each plate 250 has a horizontal guide slot 252 for the feeler-restoring bar 249. Each pair of plates 250 supports two slotted cross bars 253. Within each pair of plates 250 and adjacent thereto is a pair of drop plates 254, Figure 9A, vertically guided by the slotted cross bars 253 and by an additional slotted cross bar 255 supported by the plates 250. Each drop plate 254 is slotted at 256, Figure 9A, to support a cross rod 257 which passes through slots 258 of interponent plates 259, Figure 9B, of which there is one for each feeler 116. The interponent plates 259 are laterally spaced and vertically guided by the slotted cross bars 253, 255 and are normally held in raised positions by the cross rod 257 supported by the drop plates 254 which in turn are held in raised position by the feeler restoring bar 249 which normally is under shoulders 260, Figures 9A and 17, of said drop plates 254. When the restoring bar 249, urged by a spring 261 acting on the lever 245 or 247, is moved forwardly through release at the latch arm 237, a selected pair of drop plates 254, together with the companion set of interponent plates 259, may drop by gravity so that a V-shaped lower camming point 262 of each dropped interponent plate 259 settles between two adjacent rack teeth of a corresponding register bar 69.

*Confining total reading and type selection to a carriage-selected register*

For each register there is an individual rock-shaft 264, Figures 8, 9, 9A, 14–17, journaled in brackets 265 on the frame 123. A pair of latch arms 266 is fixed to said rock-shaft 264, said arms normally taking under shoulders 267 of a corresponding pair of the drop-plates 254 under the urge of a spring 268 which may be attached to one of said arms 266. A lever 269 is pivoted on a rod 263 which may be supported by the plates 250 and said lever is engageable by a stud 270 of the bar 231 and in turn engages one of the latch arms 266. Forward displacement of said bar 231, effected under control of the carriage as above described, turns said lever 269 clockwise, Figure 14, and thereby withdraws the latch arms 266 from the drop plates 254. This permits said drop plates and the companion set of interponent plates 259 to drop by gravity. As the interponent plates 259 thus drop, the companion set of feelers is permitted to move forwardly, under the urge of the feeler springs 119, to engage in the feeler-stopping slots 118 of the corresponding set of computing pinions. Normally the feelers 116 are restrained by the normally raised interponent plates 259 in that rollers or studs 273 on the type selector arms 121 on said feelers are behind the raised interponent plates 259 as in Figure 9B. When a set of feelers 116 and companion set of interponent plates 259 are thus released, the feeler restoring bar 249 will have been released and will have been moved forwardly through carriage-effected release at the latch 237, 238. At such forward displacement of the restoring bar 249, the other sets of interponent plates 259 and feelers 116 are restrained by means of their respective latch arms 266.

To insure prevention of simultaneous release of more than one set of interponent plates 259 and feelers 116, the following interlock mechanism may be provided. Each rock-shaft 264 has fixed thereto a locking arm 271, when the shaft 264 is rocked to release its associate feelers and interponent plates, said locking arm crowds two transverse locking bars 275, Figures 8, 9 which are slidable endwise upon pin-and-slot connections 276 to the frame 123. The crowding of said locking bars by one of said locking arms 271 blocks the locking arms 271 associated with the other registers and thereby prevents simultaneous release of more than one set of feelers 116 and interponent plates 259. The described control of the selection of a set of feelers 116 supplements the register selection, for total-printing, effected by coupling the corresponding register-bar-set to the set of denomination jacks 82, and such control constitutes a safety device.

*Timing the coupling of the highest denomination register bar and corresponding denominational jack*

As a set of feelers 116 and corresponding set of interponent plates 259 become released, the carriage stands at the position corresponding to the highest denomination of a total-printing zone and has depressed the highest denomination jack 82 thereby causing advance of the highest denomination distributive rack 99 for the carriage-selected register from which the total is to be printed. At the same time, the coupler control plate 101 will have been raised to operatively connect, by means of the couplers 100, all the other distributive racks 99 for said register to the corresponding register bars 69. A coupler 278 pivoted to the highest distributive rack 99 is not influenced by the coupler raising plate 101 but is controlled independently as follows, Figures 2, 3, 5, 13–15. When the latch arm 237 is retracted to release the link 239, the resulting forward movement of the feeler controlling bar 249 is accompanied by forward movement of the spring-urged feelers 116. Said feeler controlling bar 249 has movement in excess of the maximum movement of any feeler 116. By said excess movement, a lateral stud 279 of the link 239, which partakes of said excess movement, engages a cam arm 280 that is yoked at 281 to a latch arm 282, said arms 280, 282, being loosely fulcrumed on the rock-shaft 228. Said latch arm 282 is therefore rocked clockwise through said excess movement and retracted from a square stud 283 on the arm 242 which is fixed to the transverse rock-shaft 243. For each register, said rock-shaft 243 has movable therewith in counterclockwise direction as will be explained presently, an arm 284 having a pin-and-slot operative connection 285 to an extension of the coupler 278. Thus, with the distributive rack 99, on which said coupler 278 is pivoted, having been advanced by means of its jack 82, and with the shaft 243 having been spring rocked counterclockwise consequent to retraction of the latch arm 282, said shaft will have operated to raise the coupler 278 against the highest denomination register bar 69 and thereby will have cammed the latter slightly forward, as in Figures 13, 14, said coupler having at its forward end a camming bevel engaging a roll 286 on the side of the register bar. This slight advance of the register bar 69 raises the corresponding dropped interponent plate 259 by means of the camming point 262, as in Figure 13. In turn, said interponent plate 259, with its upper horizontal edge under the roller 273 of the type selector arm 121, turns said arm 121 clockwise so that the selector 120 thereon, lifts the blade 124 under which it is positioned and thereby causes an operation of the corresponding type action depending on the blade lifted being for a significant figure type action, or causes an actuation of the typewriter spacer depending on the blade lifted being for "0." Said actuation of a type action or of the spacer is effected, of course, by the snatch roll 57.

It will be seen, now, that the slight forward advance of the highest-denomination register bar 69 and the resulting lifting of a blade 124 for effecting actuation of a type action, or of the carriage spacer can occur only after the feelers 116 and selectors 120 have been given time to complete their maximum movements for selecting a blade 124. Hence there can occur no lifting and collision of a selector 120 with the blades 124 while the selectors are being moved forwardly with their feelers 116.

The coupler controlling arm 284 is connected by a yoke 287 to an arm 288 having a curved flange 288ᵃ concentric with the rock-shaft 243 on which said arms are loosely fulcrumed. A spring 289 connected to each yoke 287 urges the arms 284, 288 counterclockwise, Figure 5, so that a lateral pin 290, Figures 3 and 15 in the arm 284 abuts an edge of an adjoining arm 291 fixed to the rock-shaft 243. When the shaft 243 is released by retraction of the latch 282, it is rocked counterclockwise by a spring 292 connected to the stud 241 of the rock-shaft arm 242, Figures 3 and 5. The arms 284, 288 tend to follow counterclockwise the arms 291 under the urge of their spring 289. Therefore, if a bar 231 has been slightly advanced, the corresponding flange 288ᵃ of the arm 288 becomes positioned behind and blocks restoration of said bar 231, as in Figures 13, 14, for a purpose explained hereinafter. The flanges 288ᵃ, corresponding to the bars 231 that are not advanced, merely stop upon the upper edges of said bars 231 when the shaft 243 is rocked counterclockwise, the respective springs 289 being therefore, ineffective to move the flanges 288ᵃ farther while the rock-shaft spring 292 rocks shaft 243 to its full extent which may be limited as by abutment of the arm 242 with a stop 293, Figure 5.

Printing the total

The carriage reaches the highest denomination of a total-printing zone and depresses the highest denomination jack 82 through having been caused to be tabulated to said zone or highest denomination by operation of the total key lever 166. Pursuant to the above-described operation of the carriage spacer or of a numeral type action caused by depression of the highest denomination jack 82, the carriage takes a letter-feed step and thereby engages and depresses the succeeding jack 82 to cause another operation of the carriage spacer or of a type action as determined by the feeler-read angular position of the computing pinion associated with said succeeding jack 82. It will be recalled that the carriage spacer is worked automatically for all computing pinions that register insignificant zeros ahead of the first significant figure of a total, as where the total is of a lesser number of denominations than the number of denominations constituting the computing or total-printing zone. But for the first significant figure denomination, and for each succeeding denomination, a type action is caused to be operated through the depression by the carriage of the jacks 82 corresponding to these denominations, it being understood that the carriage spaces at each operation of a type action and thereby causes operation of another type action. This briefly-described progress of the printing of the total is more fully set forth in my aforesaid co-pending application, Serial No. 42,611, now Patent No. 2,258,714, and in the Pitman Patent No. 2,192,365.

Clearing the register from which the total is printed

When a cam plate 102 is depressed by the total control tappet 213 of the column unit 86, it is effective, in the same way as described in the above section on State control, to withdraw the corresponding latch 108 to release the spring-pressed state-controller bar 119. It will be remembered that the jacks 217 have become operatively connected at their tabs 215 to the cam plates 102 when the latter have been shifted rearwardly by operation of the total key lever 166. Each arm 216 of a jack 217 overlies a forwardly extending tongue 295, Figures 12, 13, 19 of the subtraction cam plate 111. Thus at depression of a cam plate 102 by the total-control tappet 213, the corresponding jack 217 is depressed and in turn depresses the subtraction cam plate 111 to effect withdrawal of the latch 109 whereupon the state controller bar 110 assumes its extreme forward position to determine subtractive connection of the computing pinions to the idlers 72 during a subsequent cycle of the general operator. At operation of the type actions for printing a total, the corresponding pin-setting linkages 78 are actuated to set those register pins 76 corresponding to the total standing in the computing pinions. Thus at said subsequent cycle of the general operator, the total will be cleared from the computing pinions so that all of said pinions of the set from which the total was printed should finally stand at zero.

The carriage automatically initiates the cycle in which the total is cleared. For this purpose the cycling tooth 113 on the column unit 86 passes over and rocks the cycle trip lever 114 in that carriage step which follows the printing of the last figure of the total.

Automatic clear sign printing

A sign, preferably a star, may be printed adjacent the total printed on the work sheet to signify that the indexing and cycling operations attending the automatic total-printing have resulted in clearing the register from which the total was printed. The mechanism, Figures 1-5, 31, 32, for this purpose will now be described.

The computing pinion discs that have the totalreading-feeler-receiving slots 118 may have peripheral notches 294 for receiving individually-spring-pressed detent arms 296 fulcrumed on a common rod 297 spanning the side plates 75 of the computing pinion frame. The notches 294 corresponding to the "0" positions of the several computing wheels are somewhat deeper than any of the other notches. A bar 298, and its side arms 299 pivoted to said plates 75 at 300, are spring-pressed against said detent arms 296. There is a set of detent arms 296 and a bar 298 for each of the totalizers. If a totalizer is all clear, all of its detent arms 296 will be in the deeper or "0" detent notches and this will permit the corresponding spring-pressed bar 298 to assume a position, Figures 1 and 2, in which a spur 301 thereof is out of the path of downward movement of a sensing bar 302. But if any one of the computing pinions is not in the "0" position, the correspondingly positioned detent notch, of less depth, will position its detent arm 296 to keep the bar 298 with its spur 301 in the path of a spur 303 of the sensing bar 302 as in Figure 13. Said bar 302 has a leg 304 passing through a guide hole in a framework cross bar 305 and has another leg 306 guided in a slot in said cross bar 305 as in Figure 1. Said sensing bar 302 has also a guiding connection 307 to a bracket 308 attached to said framework bar 305. The previously mentioned latch pawl 235 normally is under a shoulder 309 of the sensing bar 302. Thus even if all the computing pinions of any totalizer stand at "0," the sensing bar 302 cannot move downwardly unless said pawl has been first retracted. Retraction of the pawl 235 occurs, as in Figure 13, through forward movement of the bar 231 effected by depression by the carriage of that jack 217 that corresponds to the totalizer from which the total is printed. It will be remembered that each jack 217 is operable by a cam plate 102 and in turn operates through the thrust rod 218, bell crank 220, rack 221, and rack 222 to move said bar 231 to retract said latch pawl 235.

Each sensing bar 302 has a pin-and-slot connection 311 to a bell crank 312 pivoted to a bracket 313 on the framework. Each bell crank 312 is articulated at 314 to a draw bar 315 extending fore and aft and slidably supported by a front pin-and-slot connection 316, Figure 2, to the bracket 313. Each draw bar 315 has a slot 317, Figures 4 and 5, slidably fitting the neck of a headed stud 318, threaded into a transverse bar 319 which overlies the several draw bars 315. Said transverse bar 319 may lie slidably upon the several state control bars 110 and serves to restore the latter during a cycle of the general operator. By means of their slots 317 and the studs 318, the several draw bars 315 are slidably supported by said transverse bar 319. The latter is connected at each end by a link 320 to an arm 321 of a rock-shaft 322 journaled in the computing base framework. A link 323 is connected to an arm 324 of said rock-shaft and is urged counterclockwise, Figure 5, by a spring 325 and bears normally against the bottom of the general operator cross bar 112. Said link 323 has a hook 326 which is normally forward of said general operator cross bar 112. After the reciprocatable general operator cross bar 112 has moved forwardly beyond said hook 326, the latter will become placed by the spring 325 into the return path of said cross bar 112. Therefore, said cross bar 112 during the end portion of its return stroke engages and moves said link 323 rearwardly and thereby rocks the shaft 322 and moves the transverse bar 319 rearwardly for restoring the state control bars 110. At the ending of the rearward stroke of the general operator cross bar 112, the link 323 automatically becomes disengaged therefrom by means, not shown, and consequently the transverse bar 319 and the rock-shaft 322 become restored by a suitable spring, not shown. Said means and spring may be as shown in Pitman Patent No. 2,118,860, dated May 31, 1938.

Each draw bar 315 has pivoted thereto a lever 328 urged clockwise, Figure 5, by a spring 329, so that an oblique arm 329ª thereof bears laterally against the head of the stud 318. Each draw bar 315 is thus yieldably connected to the transverse bar 319 and therefore rearward movement of the latter will move rearwardly any draw bar 315 which is free to so move depending on clear condition of the corresponding totalizer and retraction of the corresponding latch pawl 235. If any draw bar 315 is not free to move rearwardly, its oblique arm 329ª is cammed aside by the stud 318 at the rearward movement of the transverse bar 319 and the stud 318 merely moves idly in the draw bar slot 317. At restoration of the transverse bar 319 forwardly the spring 329 returns the oblique arm 329ª.

Each draw bar 315 has a stud 331 to engage a transverse bar 332 pivoted at its ends to the framework as at 333. An arm 334 of said bar 332 engages an arm 335 fulcrumed loosely on the rock-shaft 246, Figure 5. A vertical thrust rod 336 is pivoted at 337 to said arm 335 and has a guide bracket 338, Figure 2, on the computing base framework. Said rod 336 engages a transverse lever 339 fulcrumed at 340 on the typewriter framework. Said lever 339 engages as at 341 the forward arm 342 of a lever whose rear arm forms a draw link 343 having a toothed pawl 56ª for engaging the power-rotated snatch roll 57. Said draw link 343 is pivoted at 344 to a lever 50ª fulcrumed on the transverse rod 51. Said lever 50ª is operatively connected to a type bar 43ª having a star-printing type 346. Said type bar 43ª is similar to the previously described type bars 43 and may be connected to the lever 50ª by parts similar to the previously described parts 44, 45, 48. Therefore such parts are diagrammatically represented at 347 and said type bar 43ª is only partly shown, Figure 5.

The operation of the type bar 43ª through the described parts results automatically as follows. In the carriage step which occurs with the printing of the last figure of a total, the cycling tooth 113 on the column unit 86 rocks the cycle trip lever 114 to initiate a cycle of the general operator and its cross bar 112. During the forward stroke of the cross bar 112, the computing pinions from which the total was printed will be rotated subtractively, to zero positions, through the idlers 72, the total having been indexed by setting the index pins 76 during the total printing. At the start of the cycle the shaft 94 is rocked clockwise from its Figure 2 position and this disables the carriage control of the thrust rods 218, corresponding racks 221 and the rods 231 that control the pawls 235. But at this time the flange 288ª is still behind the forwardly positioned bar 231 that corresponds to the totalizer from which the total was printed so that said bar 231 is not restored by its spring 349. This leaves the pawl 235 retracted from the sensing bar 302 pending rearward movement of the draw bar 315, which rearward movement occurs, as above described, when the general operator cross bar 112 in a final portion of its return stroke picks up and moves the hooked link 323. The computing pinions, from which the total was printed, having been restored to zero positions during the forward stroke of the cross bar 112, are disengaged from the idlers 72 to stand in the Figure 2 position, together with their detent arms 296 and bar 298. Thus, assuming that in the Figure 2 positions all computing pinions have been restored to zero, the bar 298 will be clear of the sensing bar 302. In that case said bar 302 is free to move downwardly, the pawl 235 having been retracted, and hence the draw bar 315 is free to be moved rearwardly by means of the transverse bar 319 to rock the bar 332, lift the rod 336, rock the lever 339 and thus connect the draw link 343 to the snatch roll 57 for a resulting rearward stroke of said draw link 343 to actuate the star-printing type bar 43a. A knock-off bar 348 common to all the snatch roll operated type actions is encountered by the draw link 343 to disengage the latter from the snatch roll 57 just before the type bar 43a reaches the platen to print the star after the last printed figure of the total. The star-printing type action, including the draw link 343, becomes restored automatically by a spring 350. At about this time also the cycle is completed and the hooked link 323 becomes released from the general-operator cross bar 112 whereupon the draw bar 315 and the thereby operated parts, including the sensing bar 302 and the transverse lever 339 become restored. A restoring spring 351 is connected to the lever 339 which normally abuts a stop 352 in the framework. A restoring spring 353 may be connected to the draw bar 315.

*Restoration of total taking mechanism during a cycle*

The rock-shaft 246 to which the feeler restoring bar 249 is connected has fixed thereto arms 355, Figures 2, 3, having rolls 356 engageable by cams 357 formed in the sides of the side racks 358 to which the general-operator cross bar 112 is connected by plates 359. At the initial part of the forward stroke of said cross bar 112 and its racks 358, the cams 357 rock said shaft 246 clockwise of Figure 2 and thereby move the feeler restoring bar 249, its link 239, and the operated feelers 116 rearwardly whereupon said link 239 becomes latched again in its normal position by the latch arm 237 fixed to the rock-shaft 228. The previously mentioned rocking of the shaft 94 and the attending disablement of the racks 221 leaves the rock-shaft 228 and its latch arm 237 free to relatch said link 239 under the urge of a spring 360, Figure 17. Said rock-shaft 228 and its latch ram 237 are also free to relatch in that the carriage tappet will have passed from the cam-plate 102 in the carriage step which initiates the cycle. The rock-shaft 243 that was released by retraction of the latch arm 282 through forward movement of said link 239 is restored at the rearward stroke of the general operator cross bar 112 by means of the hooked link 323. Therefore, said link 323 has pivoted thereto at 361 a link 362 having a slot 363 slidably and rockably fitting the stud 241 in the arm 242 of said rock-shaft 243. The forward end of said slot 363 is normally forward of the stud 241 as in Figure 15 so that said shaft 243 is free to rock counterclockwise when released from the latch arm 282. But at rearward movement of the link 362 with the hooked link 323, said rock-shaft 243 is rocked clockwise to become restored to the latch arm 282. The restoration of the shaft 243 restores the operated unit, comprising the yoked arms 284, 288 and flange 288a, so that said flange becomes restored from behind the bar 231 which in turn becomes restored by its spring 349, Figure 5, thus putting the pawl 235 back to normal position to be ready to oppose, as subsequent occasion may require, downward movement of the sensing bar 302.

Pivoted to one of the side arm 299 of each bar 298 is a bar 364, Figures 31, 32, which slidably rests upon a bar 365 to which are anchored springs 366 for the detent arms 296. Said bar 365 may be supported by the computing-pinion-frame plates 75. At rearward movement of the computing pinions and their frame plates 75, said bar 364 would move also but it is blocked by the register bar guide comb 70. This causes the bar 298 to move forwardly relatively to and away from the computing pinions and thereby move the detent arms 296 forwardly off the detent notches 294 as in Figure 32 so that said spring-pressed detent arms 296 offer little or no resistance to rotation of the computing pinions during cycling. A similar result obtains when the computing pinions are swung downwardly, about the axis of shaft 73, to engage directly with the register bars. In the latter case, the swinging movement of the bar 364 about said axis will also be blocked by the guide comb 70 so that there results a displacement of the bar 298 and hence of the detent arms 296 away from the computing pinions.

Each detent arm 296 has a slot 367 to receive the bar 298. Said slots 367 are wider than the thickness of the bar 298 so that in respect to the different, zero and non-zero, positions of said detent arms the front edges of said slots 367 and said bar 298 do not interfere. Said bar engages said front edges for moving said detent arms off the notches 294. As will be evident from Figure 32, the overwidth slots 367 also permit the detent arms 296 to move forwardly without opposition from the spring-pressed bar 298 as when the latter does not move said detent arms entirely clear of the notches 294. During the clear-sign-printing stage of a general-operator cycle, each bar 298 is back in its normal position, ready to control clear-sign-printing, since it is only during an earlier stage of the cycle that said bars function as described to relieve the computing pinions of their detent arms 296.

*Controls for sub-total printing*

A sub-total key lever 368, Figure 21, having a key 368a is fulcrumed on the same rod 167 as the total key lever 166. Said lever 368 engages at 369 a reed 370 guided in the slotted fixture 171, Figure 2, like the reed 170 and disposed to the right of the latter. Said reed 170 has a pin 371 normally engaged by the bottom of a vertical slot 372 in the reed 370 so that the raising of the latter by operation of the sub-total key lever 368 also raises the reed 170. The slot 372 permits the reed 170 to be raised independently of the reed 370. A pin 373 in the reed 370 engages an arm 374 fixed to a rock-shaft 375 journaled in the housing 83. Another arm 376 fixed to said rock-shaft 375 engages a pin in a plate 377 that is similar to the hereinbefore referred to plates 104 and is guided for vertical movement like the latter in the housing 83. The plate 377 abuts a thrust rod 378 guided in a plate 379 in the computing base framework. Said rod 378 has connection, including intermediate levers 380 fulcrumed at 380a in said framework, and a link 381, to a lever 382 pivoted at 382ª to said framework, see also Figure 20. Said lever 382 has a pin-and-slot connection 383 to a transverse locking bar 384. Plates 385 on the computing base framework overlie the state controller bars 110 and support the latter slidably by means of depending headed studs 386. Each plate 385 has a transverse slot 385ª slidably fitting the neck of a T-block 387 fastened to the locking bar 384. In the normal positions of the parts, the locking bar 384 is positioned so that the heads of its blocks 387 are laterally offset from and clear of shoulders 388 of the state control bars 110.

Operation of the sub-total key lever 368 raises the reed 370 to rock the shaft 375 to depress the plate 377 and hence, through the levers 380 and link 381, turn the lever 382 counterclockwise, Figure 21, to move the locking bar 384 to bring the heads of its blocks 387 opposite the shoulders 388 of the state controller bars 110 as in Figure 20 which is a view of the parts from the bottom of the machine. A latch lever 389 pivoted to the framework at 390 is urged by a spring 391 to engage a stud 392 of said lever 382 to hold the latter, and hence the locking bar 384, in operated positions as in Figure 20.

The raising of the reed 370 also raises the rod 170 so that the latter works through the rod 202 and its comb 208 to rock the register-selecting cam plates 102 to bring their upper cam edges into line with the positions for the total-taking control tappets 213 on the column unit 86 as hereinbefore described. Such raising of said reed 170 by means of the sub-total key lever also releases the carriage and interposes the tabulating tooth 192 to arrest the resulting carriage movement at the highest denomination position for the work column at which the sub-total is to be printed. For said column, therefore, the corresponding column unit will have a total printing control tappet 213 for selecting the register from which the sub-total is to be printed. The corresponding cam plate 102 will correspondingly be depressed to effect release of the feelers 116 corresponding to said register. Such depression of said cam plate 102 also effects withdrawal of the state-controller-bar latches 108, 109 as hereinbefore described, but the advance of the corresponding state controller bar 110 is blocked by the sub-total-key-positioned locking bar 384. The latter thus determines that at a subsequent cycle of the general operator mechanism, effected to restore the parts released for sub-total printing, the computing pinions will not be meshed with their drivers and thus the printed total will not be cleared from the register in that it is a sub-total. One side of the slot of the pin-and-slot connection 383 is embodied in a lever 393 pivoted to the lever 382 and normally held in abutment with the latter at 393ª by a spring 394. This permits said connection to yield in case it is attempted to operate the locking bar 384 while a state controller bar 110 is in forward position.

In the cycle of the general operator mechanism which follows sub-total printing, the latch lever 389 is rocked counterclockwise, Figure 20, to release the lever 382 for resulting restoration of the locking bar 384 by a spring 395 applied to the link 381. To this end a thrust bar 396 pivoted to said latch lever 389 and slidably connected to the framework at 397 is engaged by a pusher 398 connected to the hereinbefore described restoring bar 319 of the general operator mechanism. Restoration of said locking bar 384 may also be effected in a different manner as will be described later.

Sub-total printing may be determined automatically by the carriage. To this end there is provided in the housing 83 a cam plate 399 depressible by a sub-total tappet 400 provided in the column unit 86. Said plate 399 when depressed depresses the plate 377 to effectively position the locking bar 384. When the carriage is thus employed to determine sub-total printing, the total key lever 166, instead of the sub-total key lever 368, is operated.

Following the effective positioning of the locking bar 384, preparatory to sub-total printing, it may occur that a cycle of the general operator mechanism intervenes and consequently restores said locking bar 384 before the sub-total has been printed. For example, the carriage may be in such position when the sub-total key is depressed, and immediately released, that the resulting carriage jump is extensive so that the carriage passes over and trips the cycle trip lever 114, thus causing the general operator mechanism to cycle and possibly effect restoration of the locking bar 384 before the carriage reaches the sub-total printing zone at the end of such extensive jump. In such case, the restored locking bar 384 may become effectively positioned again if the sub-total key is kept depressed at least until the intervening cycle is completed, or it may become effectively positioned again by re-operating the sub-total key lever 368. To make such sustained or repeated operation of the sub-total key unnecessary, the mechanism, Figures 26–30 and 33, which will now be described is provided.

A rock-shaft 403 is journaled in and extends from side to side of the computing base. Fixed to said rock-shaft is an arm 404 having a lateral tab 405 upon which normally rests an arm 406 fulcrumed loosely on said rock-shaft 403. Pivoted to said arm 406 is a depending rod 407 whose lower portion 407ª passes through a slot 408 in the thrust bar 396. A spring 409 anchored to the framework urges said rod 407 clockwise, Figure 26, and downwardly so that normally a shoulder 410 of said rod 407 rests on the top of the thrust bar 396. Also fixed to said rock-shaft 403 is an arm 411 having a lateral tab 412. A spring 413 urges the arm 411 and the rock-shaft 403 clockwise of Figure 26. The tab 412 of said arm 411 normally engages a hooked latch arm 414 fixed to the rock-shaft 228.

It will be remembered that said shaft 228 is rocked clockwise, Figure 26, at depression of a predetermined cam plate 102 by the carriage at a total printing zone to which said carriage becomes tabulated by operation of the sub-total key lever 368; and it will also be remembered that the rocking of said shaft 228 releases the feelers 116 for the register corresponding to the operated cam plate 102. The clockwise rocking of said shaft 228 withdraws the hooked latch arm 414 from the arm 411 and it results that the shaft 403 is rocked clockwise to a position determined by a stop 418, Figure 33, in the framework engaging the arm 406 which becomes rocked upwardly by said shaft 403. This positions the rod 407 so that a vertical edge 419 thereof is in line with the pusher 398 as in Figure 29. At the time the rod 407 is thus positioned, the thrust bar 396 has become moved forwardly through the counterclockwise rocking of the latch lever 389 to interlock with the lever 382. In the normal position of the rod 407, Figure 28, its edge 419 is below and thus unengageable by the pusher 398, for in said position said rod presents a portion 420 offset from said edge 419, the portion 420 being thus not reachable by the pusher 398 at the rearward stroke of the latter.

An arm 422 fixed to the rock-shaft 403 is connected by a link 423 to a lever 424 fulcrumed at 425 to the frame work. When said shaft 403 has been rocked clockwise, Figure 33, to raise the rod 407 to the Figure 29 position, said lever 424 becomes rocked clockwise to dispose its cam-ended arm 424ª in the path of the general operator cross bar 112. At a subsequent cycle of the general operator, the advancing cross bar 112 overrides and depresses said arm 424ª thereby rocking the lever 424 counterclockwise and restoring the rock-shaft 403 to reengagement with the latch arm 414. This occurs during a cycle which follows the printing of the last figure of the sub-total and it is at the initial portion of the cycle that said shaft is restored. But, pending rearward movement of the pusher 398 during the final portion of the cycle, the rod 407 remains in its Figure 29 raised position because a shoulder 426 of said rod 407 rests upon the top of the thrust bar 396 adjacent the slot 408 as in Figure 29. When the pusher 398 finally engages the rod 407 and pushes the latter, together with the bar 396 rearwardly, the shoulder 426 is moved off the bar 396 and over the slot 408 causing said bar 407 to drop under the influence of the spring 409 until a shoulder 428 of said rod 407 stops upon the top of the pusher 398 as in Figure 30. When the pusher 398 recedes from the rod 407 at the end of the cycle after having done its work, through the rod 407, of moving the bar 396 rearwardly to release the lever 382, said rod 407, urged by the spring 409, drops fully to its normal position together with the arm 406 which finally rests again upon the tab 405 of the previously restored rock-shaft 403.

It will be seen now that the general operator mechanism cannot operate through its pusher 398 to restore the thrust bar 396 through the rod 407 unless the latter has been raised to the Figure 29 position through withdrawal of the hooked latch arm 414. And as such withdrawal can only occur through the carriage having reached the subtotal printing zone, it will be seen that it is upon this circumstance that restoration of the thrust bar 396 and hence restoration of the locking bar 384 depends. It follows that an intervening cycle as above mentioned cannot cause premature restoration of said locking bar 384 from its effective position determined by operation of sub-total key before the carriage reaches the sub-total printing zone.

The cam-ended arm 424ª may have a dwell 424ᵇ so as to be engaged and kept in restored position by the general operator cross bar 112 during the advance and return strokes of said cross bar.

The initiation of a cycle causes an interponent 429, pivoted at 403ª, to become placed under an extension 422ª, Figures 10, 33, of the arm 422 of the shaft 403 for preventing accidental rocking of the latter during a cycle. When the cycle tripping shaft 115ª is rocked, its latch arm 415 is released from a clutch-control plate 416 whereupon the latter has a spring-urged small initial clockwise rotation to the Figure 10 position on the cycle shaft 117. It results that said shaft 117 becomes clutched to a power drive for a cycle of rotation in which said plate 416 is carried along and finally encounters the latch arm 415 again. The resulting arrest of said plate 416 by said latch arm 415 opens the clutch and disconnects the shaft 117 from the power drive to terminate a complete cycle of revolution of said shaft 117. The clutch mechanism, including a plate such as 416, may be of the kind referred to in my aforesaid Patent No. 2,160,487. Connected by a hub 417ª, Figure 11, to said plate 416 to rotate therewith is a cam disc 417 which actuates a spring-pressed follower arm 430 fulcrumed on the framework and operative by means of connections 431, Figure 10, to place said interponent 429 under the arm extension 422ª. The connected plate 416 and cam disc 417 are rotatable about a hub 421 of a disc 427 that carries clutch pawls 427ª engageable with and disengageable from a power driven toothed driver 421ª rotatably loose on the cycling shaft 117. Engagement and disengagement of said pawls and driver are controlled by the disc 416. The clutch pawl disc 427 is fixed at its hub 421 to the shaft 117.

*Sub-total sign printing mechanism*

Fulcrumed on the framework at 432 is a lever, Figures 26, 33, having an arm 433 articulated to the thrust bar 396 at 434. Another arm 435 of said lever has a pin-and-slot connection 436 to an arm 437 connected by a yoke 438 to an arm 439, both arms being rotatably loose on the rock-shaft 403. Pivoted to the arm 439 at 440 is a pawl 441 having a tail 441ª the weight of which tends to turn said pawl 441 clockwise, Figure 26, and keep it against a vertical shoulder 442 of a draw link 443 pivoted at 444 to a lever 50ᵇ fulcrumed on the rod 51. A link 445 connects said lever 50ᵇ to a bell crank 446 fulcrumed, like the bell cranks 45, at 46 and connected to a type bar 447 adapted to type the letter "S."

Upon forward movement of the thrust bar 396 to the position resulting from operation of the sub-total key 368ª or of the sub-total cam plate 399, the lever 433, 435 is rocked clockwise thereby rocking the arm 439 downwardly so that the pawl 441 leaves the draw link shoulder 442 and becomes positioned under an edge 448 of the draw link 443 as at Figure 27. A tab 439ª on the arm 439 limits the clockwise turning of the pawl 441. At restoration of the thrust bar 396, by the pusher 398 acting through the rod 407 while the latter is in the Figure 29 position, the lever 433, 435 is rocked counterclockwise thereby raising the arm 439 and its Figure 27 positioned pawl 441 to lift the draw link 443 to bring its toothed pawl 56, into engagement with the snatch roll 57. The resulting rearward stroke of the draw link 443 operates the type bar 447 to print the letter "S." Since the cycle in which the thrust bar 396 cooperates to effect the described operation of the said type bar 447 is a cycle which automatically follows the typing of the last figure of the sub-total amount, the letter "S" is thus printed automatically after said last figure to symbolize the amount as a sub-total.

It will be obvious, Figure 26, that pusher 398 will engage edge 419 to displace rod 407 and bar 396 rearwardly only during a small last portion of the rearward stroke of bar 319 so that pawl 441 will be lifted to connect draw link 443 with snatch roll 57, and hence type bar 447 will be operated to print S at least no earlier than said last portion of the rearward stroke of bar 319. Said bar 319 may, however, by a small initial portion of its rearward stroke, move the star print control bar 315 immediately rearwardly by means of the connection 318, 328, as will be evident in Figures 4 and 5, for rocking bail 332 to connect draw link 343 to snatch roll 57, to operate the star type bar 43ª at said small initial portion of the rearward stroke of bar 319. After bail 332 has been thus rocked further immediate movement thereof may be stopped, as by engagement of draw link 343 with snatch roll 57, in which case connection 318, 328 may yield as bar 319 completes its rearward stroke. The foregoing provides for timing the operation of the S type bar 447 to follow the operation of the star type bar 43ª if it should happen that the sub-total printing mechanism is brought into play when the totalizer stands at zero.

As the draw link 443 makes its rearward stroke, it encounters the universal knock-off bar 348 and thereby becomes disengaged from the snatch roll 57. At the consequent restoration, by a spring 459, of the draw link 443, its shoulder 442 encounters the back of the pawl 441 and turns the latter counterclockwise to its normal position, Figure 26.

A manually operable type key lever 451 extends rearwardly to the same fulcrum axis 46 as do the herein-before-described levers 44 of the numeral type actions. A spring-pressed pawl 452 pivoted to said lever 451 engages an arm 453 extending forwardly from the draw link 443. Thus operation of said key lever 451 brings the draw link 443 into engagement with the snatch roll 57 for operating the type bar 447 as a member of the alphabet type action system of the typewriter independently of the pawl 441.

*Automatic carriage control of tabulation and total printing*

A cam plate 455, Figures 2, 12, 19, 22, 23, 24, in the housing 83 may be articulated at 456 to the comb 208 of the rod 202 so that operation of the latter by the reed 170 at operation of either of the total keys tilts said plate 455 rearwardly about the lower guide combs 212 from the normal Figure 2 position to the Figure 12 position, like the cam plates 102. Said plate 455 abuts an intermediate plate 457 slidably mounted in the housing 83 like the plates 104. Pivoted at 458, Figures 2 and 24, to the side of the plate 457 is a plate 459 urged counterclockwise by a spring 460 which also serves to keep the plates 457, 459 in their normal raised positions. Said plate 459 has a tab 461 which stops against the front edge of the plate 457 to position a tongue 462 of said plate 459 over a stud 463 of an arm 464 fixed to a rock-shaft 465 journaled in the typewriter framework. Another arm 466 fixed to said rock-shaft 465 has a lateral tab 467 below a draw link 468 pivoted to a lever 50ᶜ fulcrumed on the rod 51. A link 469 is pivoted to said lever 50ᶜ and has a pin-and-slot connection 470 to the total key lever 166 so that the latter may be operated independently of the lever 50ᶜ.

In the letter-feed step of the carriage which follows the printing of the last figure of a total, a tappet 471 on the column unit 86 overrides a tooth 472 of the cam plate 455 and thereby depresses the latter and the plates 457, 459 to rock the shaft 465 to lift the draw link 468 into engagement with the snatch roll 57. The resulting rearward stroke of the draw link 468 is effective through the lever 50ᶜ and link 469 to operate the total key lever 166. The resulting lifting of the reed 170 releases the carriage from the escapement for movement to the next zone as determined by a succeeding column unit 86 which may have a tabulating tooth 193 engageable by the stop tooth 192 that has become lifted into effective position along with said reed.

If said succeeding column unit has a total-taking control tappet 213, the corresponding cam plate 102 will be depressed to select a corresponding register and initiate a total-printing operation for the zone corresponding to said total-taking control tappet 213. If said such succeeding column unit 86 has no total-taking control tappet, then the carriage will have become merely tabulated to the zone corresponding to such succeeding column unit 86. It will also be obvious that automatic carriage controlled operation of the total-key lever 166 can only result, insofar as the present description has gone, if there has been a prior operation of said lever for a preceding zone and which prior operation will have operated to tilt the plate 455 rearwardly for engagement by the tappet 471.

A variation may be resorted to in that there may be no tilting of the plate 455 upon operation of the total-key lever 166. In such case, said plate 455 will not be articulated with the comb 208, as is represented in Figure 23, and may be merely slidable vertically in the housing 83. The column unit 86 has numerous slots 473, Figure 13, one of which may serve to place the tappet 471 in a position to engage the non-tiltable cam plate 455, so that the latter may be operated by the carriage, as may be desirable in some set-ups of the machine.

Another variation is that the tappet 471 may be positioned laterally on the column unit 86, Figure 25, so that it overrides and depresses the cam plate 455 in the letter-feed step which follows the hereinbefore-described automatic printing of the clear sign, instead of depressing said cam plate 455 in the letter-feedstep which follows the printing of the last figure of the total. Figure 25 indicates comparatively at 471 and 471ª such different positions of said tappet.

The tooth 472 is embodied in a member 475 having a headed stud 476 slidably fitting an oblique slot 477 in the cam plate 455. A spring 478 anchored to said cam plate 455 is attached to a headed stud 479 of said member 475. Said stud 479 is smaller in diameter than and passes through an oblique slot 455ª in the plate 455. A shoulder 481 of said member 475 normally abuts the cam plate as in Figure 24 inasmuch as said spring 478 tends to turn said member counterclockwise about the upper end of the oblique slot 477. This construction permits the carriage tappet 471 to override the tooth 472 without depressing the plate 455 during carriage return movement, as is illustrated in Figure 22.

*Silencing automatic operation of the total key lever*

Fulcrumed loosely on a shaft 482, Figures 2, 24 of the typewriter are two arms 483, 484 connected by a yoke 485. A push rod 486 is pivotally connected to the arm 483 and extends forwardly through a guide slot 487 in the guide comb plate 47 of the typewriter. A link 488 pivotally connected to the arm 484 is connected by a stud 489 to a lever 490 fulcrumed on a rod 491 in the housing 83. A lateral tab 492 of said lever 490 engages a tongue 493 of the plate 459. By pushing the rod 486 rearwardly by its key 486ª, its described connections turn the plate 459 clockwise to a position in which the tongue 462 will be disengaged from the stud 463 so that depression of the cam plate 455 by the carriage will not be effective to operate the draw link 468 and hence will not be effective to cause an operation of the total key lever 166. The automatic operation of said total key lever is thus silenced. A latching shoulder 495 on the push rod 486 becomes caught behind the comb plate 47 to maintain said rod in its rearward position. A spring 496 urges said rod 486 downwardly to keep said latch shoulder 495 in engagement with said comb plate 47. For restoring the condition for automatic operation of the total key lever 166, the rod 486 may be lifted to disengage its latching shoulder 495 from the comb plate 47, whereupon the spring 496 and the spring 460 cooperate to restore the parts to their normal, Figure 24, positions which may be determined by abutment of the stud 489 with the housing 83 as will be evident in Figure 2.

Operation

The operation of the machine is according to the set-up of the column units 86. By reason of possible variations in such set-up and in the operation of the control keys, the machine has an extremely wide range of utility. This will be apparent from the following description of the set-up and operation with reference to two out of many possible examples.

In the diagram at Figure 34, the set-up is for the work sheet 500 which includes columns for Old Balance, Debit, Credit, New Balance, and Proving Balance. The carriage carries a corresponding number of column units 86 and these are shown in the diagram above their respective work sheet columns for convenience of identification. Three registers of the machine are respectively indicated in the diagram as No. 1, No. 2 and No. 3. The cam plates 102 corresponding to said registers are indicated as #1, #2 and #3. The diagram indicates said cam plates by their upper cam edges and shows these edges in full lines to represent them at their normal positions, and in dotted lines to represent the positions at which said cam edges become placed in response to operation of either total key, 168 or 368ª. Similarly the tooth 472 that relates to automatic tabulating is shown in normal position by full lines, and in its total key operated position by dotted lines. The sub-total cam plate 339 and the subtraction cam plate 111 are also represented by their upper cam edges in said diagram, and these plates need not be movable fore and aft. in the present instance. Each column unit 86 may have a tooth 113 to engage the cycle tripping lever 114. Each column unit 86 may also have the usual denomination selecting tappet 85 for engaging the denomination jacks 82.

Entries in the Old Balance column are entered additively in the No. 2 register and the No. 3 register as indicated by the lead lines from said column to these registers. The column unit 86 for this column will therefore have two tappets 103 placed to engage the #2 and the #3 cam plates 102 in the full line positions of the latter.

Entries in the Debit column are entered additively in the No. 1 register and the No. 2 register, and the Debit column unit will therefore have two tappets 103 positioned to engage the #1 and the #2 cam plates 102 in the full line positions of the latter.

Entries in the Credit column are entered in the No. 1 register and the No. 2 register subtractively. The Credit column unit 86 will accordingly have two tappets 103 for engaging the #1 and the #2 cam plates 102 in the full line position of the latter. This Credit column unit 86 will also have a tappet 111ª for engaging the subtraction cam plate 111. It may be desirable to print the summation of a number of entries in the Debit column and the Credit column and to print said summation as a sub-total in the Credit column, for example, as indicated by the lowermost amount in the Credit column of the diagram. This summation is automatically printed, in consequence to operation of one of the total key levers 166, 368, from the No. 1 register. The credit column unit 86 will therefore have a total control tappet 213 for engaging the #1 cam plate 102 in its dotted line position. It will be noted that for such summation all the cam plates 102 will be in their dotted line positions, but it will be only the #1 cam plate 102 that will be operated since the column unit has no tappets for the other cam plates 102 in their dotted line position. It will be seen, therefore, that the relative shiftability of the cam plates 102 and the tappets 103, 213 provides for making available different plans of register selection. The Credit column unit 86 may have a tappet 471ª for engaging the automatic-tabulating tooth 472 if it is desired to have the carriage tabulate automatically from the Credit column after sub-total printing including the sub-total sign "S."

Entries in the New Balance column are the automatically printed totals from the No. 2 register. Therefore, the New Balance column unit 86 will have a tappet 213 to engage the #2 cam plate 102 in the latter's dotted line position. Upon printing of the last digit of each New Balance entry, the machine is automatically caused, by means of the cycling tooth 113, to be cycled and the No. 2 register becomes cleared during the cycle, and the cycle further operates to print the star after said last digit to symbolize such clearing of the No. 2 register. In the letter-feed step of the carriage which follows the printing of the star, the carriage may become automatically tabulated to the Proving Balance column if the New Balance column unit 86 has a tappet 471ª for engaging the automatically-tabulating tooth 472.

Entries in the Proving Balance column come out of the No. 3 register in that the amount standing in this register is copied by manual operation of the type keys or is read automatically and printed through operation of the total printing mechanism. If the Proving Balance amount is an automatically printed total from the No. 3 register, then the Proving Balance column unit 86 will have a tappet 213 to engage the #3 cam plate 102 in the latter's dotted line position. If the entry in the Proving Balance column is effected by manual operation of the type keys, then the column unit 86 will have a tappet 103 to engage the #3 cam plate 102 in the latter's full line position. This column unit may also have a tappet 111ª to engage the subtraction cam plate 111 in order to determine subtractive clearing of the No. 3 register.

Referring now to the Credit column again, the carriage may be caused to be automatically tabulated therefrom to the New Balance column upon merely entering a Credit item. For this purpose the Credit column unit may have a tappet 471 to engage the automatic-tabulating tooth 472 in the latter's full line position.

Figure 35:
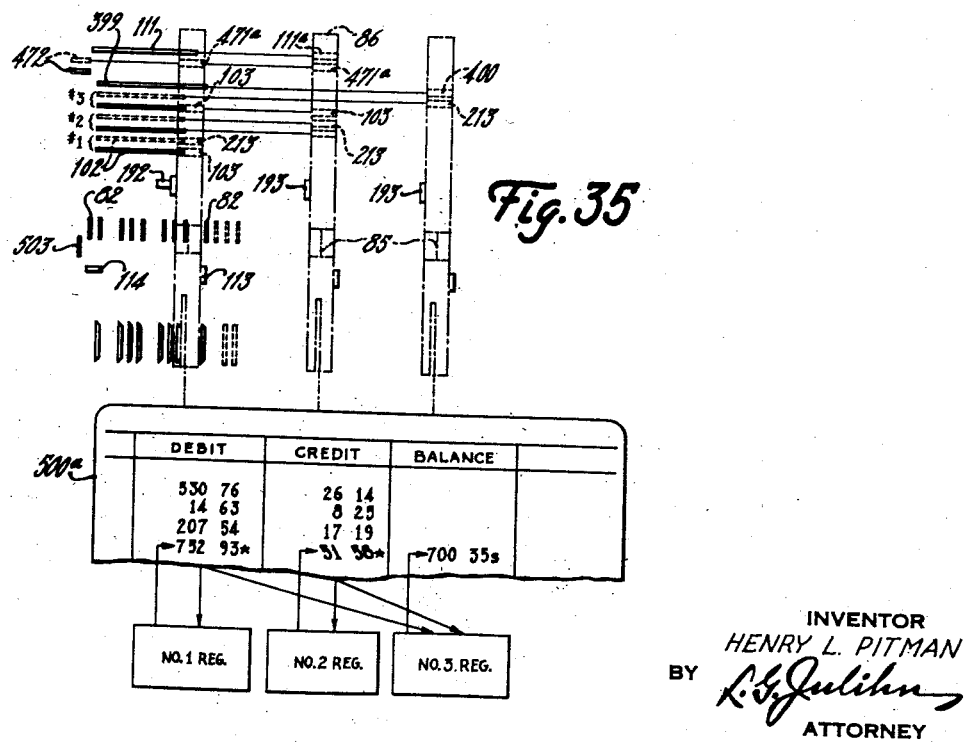

The diagram at Figure 35 represents another work sheet 500ª having three columns designated as Debit, Credit and Balance.

Entries in the Debit column are entered additively in the No. 1 register and the No. 3 register and the corresponding column unit 86 will have two tappets 103 for engaging the #1 and the #3 cam plates 102 in the latter's full line position.

Entries in the Credit column are entered subtractively in the No. 2 register and the No. 3 register and the corresponding column unit 86 will have tappets 103 for engaging the #2 and the #3 cam plates 102 in the latter's full line position. This Credit column unit 86 will also have a subtraction tappet 111ª.

Entries in the Balance column are taken periodically from the No. 3 register as a sub-total which may be printed in line with the totals of the Debit column and Credit column. After several entries have been made in the Debit and Credit columns, the carriage is returned preparatory to taking the totals across the work sheet as indicated by the lowermost amounts. The total key lever 166 is operated preparatory to taking the Debit total which comes out of the No. 1 register. The Debit column unit 86 will therefore have a tappet 213 for engaging the No. 1 cam plate 102 in the latter's dotted line position. The Debit column unit 86 will also have a tappet 471ª for engaging the automatic-tabulating tooth 472 in the carriage step which follows the printing of the star after the debit total.

It results from the carriage operation of said tooth 472 that the carriage is tabulated to the Credit column and the credit total is automatically printed from the No. 2 register. Therefore the Credit column unit 86 will have a tappet 213 for engaging the #2 cam plate 102 in the latter's dotted line position. The Credit column unit 86 will also have a tappet 471ª for engaging the automatic-tabulating tooth 472 in the latter's dotted line position to determine automatic tabulation to the Balance column and automatic printing of the Balance sub-total which is taken from the No. 3 register. The Balance column unit 86 will therefore have a tappet 213 for engaging the #3 cam plate 102 in the latter's dotted line position, and it will also have a tappet 400 to engage the sub-total cam plate 399.

Each column unit 86 that is involved in automatic total printing will of course have a tooth 193 to engage the tabulating tooth 192 that is projected into the path of the carriage by operation of the total key-lever 166.

At advance of the carriage following automatic printing of a total, the denomination selecting tappet 85 depresses a jack 503 and thereby moves the latch 206 to release the rod 202 whereupon the latter urged by its spring 214 moves forwardly to normal position and thereby restores the cam plates 102 and the automatic-tabulating cam plate to normal positions. Said jack 503 is slidable vertically in the housing 83 and is articulated to and abutes a lateral tab 504 of the latch 206 as at 505, Figures 12, 19. The jack 503 may be laterally positioned relatively to the tappet 85 so as to suitably time its operation. For example, its operation may occur in the letter-feed step following printing of the clear sign or sub-total sign. In this step there may be an operation of the tooth 472 by the tappet 471, but the latch 206 will be ready to reengage said rod 202 again due to sufficient time lag from the momentary operation of the latch 206 by the tappet 85 and the rearward resetting of said rod 202 by the operation of the tooth 472.

If the machine is set up for automatic tabulating and total printing by means of the automatic-tabulating tooth 472, such condition may be silenced at will by displacing rearwardly the push rod 486. Conversely, restoration of said push rod forwardly at will restores the condition for automatic-tabulating as determined by the set up.

The machine has been illustrated with reference to three registers. But the invention is not limited in this respect and is applicable to any other number of registers which may be provided in machines of this kind.

In the carriage step which follows the typing of the last character in the last column of the work sheet, a tappet 507, Figure 2, on the carriage may engage and operate a member 508, thereby bringing into play power operable carriage return mechanism to return the carriage automatically to a position preparatory to working in the first column of the work sheet. At such power return of the carriage, the work sheet is also line spaced automatically. A suitable carriage return mechanism is shown in my aforesaid Patent 2,160,487. Such last character may be a clear sign. If the clear sign is not printed, due to some abnormality which resulted in the register not being cleared, the carriage will not take the step which initiates the automatic return of the carriage. The operator is thus apprised, through non-occurrence of the expected carriage return, of the abnormality and can therefore make the necessary observation or correction. Similarly, if automatic tabulation of the carriage is expected to follow upon printing the clear sign at an intermediate column, the operator will be apprised, through non-occurrence of such automatic tabulation, of an abnormality.

Variations may be resorted to within the scope of the invention and portions of the improvements used without others.

What is claimed is:

1. In a machine of the character described, the combination with numeral types, a letter-feedable carriage cooperable therewith and a plurality of totalizers of the type operable during a cycle of a general operator subsequently to amount-indexing operations, of a total-printing control, mechanism responsive to operation of said control to tabulate said carriage to a total-printing zone, a plurality of devices, one for each totalizer, conditioned by operation of said control for selective operation by said carriage at said zone to select one or another totalizer for having its total printed, and mechanism called into play by any one of said control-conditioned carriage-operated devices for printing the total automatically, digit by digit, from the corresponding totalizer by means of said types and carriage.

2. In a machine of the character described, the combination with numeral types, a letter-feedable carriage cooperative therewith, and a plurality of totalizers of the type operable during a cycle of a general operator subsequently to amount-indexing operations, of a total key, mechanism responsive to operation of said key to tabulate said carriage to a total-printing zone, selectors corresponding to said totalizers and shiftable collectively, by operation of said key, from a normal position to a position for selective operation by said carriage at said zone to select one or another totalizer for having its total printed, and mechanism called into play by any carriage operated shifted, selector for printing the total automatically digit by digit from the corresponding totalizer by means of said types and carriage.

3. In a machine of the character described having a cycling general operator, the combination with numeral types, a letter-feedable carriage cooperative therewith and a plurality of totalizers, of tappet-means movable with said carriage, control members, one for each totalizer, selectively operable by said tappet-means preparatory to operation of the corresponding totalizers in respect to the typed amounts during cycling of said general operator, means to shift said members jointly to positions out of the path of said tappet-means, a tappet movable with the carriage to operate a predetermined one of the shifted control members to select the corresponding totalizer for having its total printed, total-reading, type-selecting and type-actuating means which may be called into play for any totalizer, and means effective, in response to the operation of said shifted control member, to call said total-reading, type selecting, and type-actuating means into play to print the total automatically by means of said types.

4. In a machine of the character described having a cycling general operator, the combination with numeral types, a letter-feedable carriage cooperative therewith, and a totalizer, of a control member for said totalizer shiftable from a normal position to an alternative position, a tappet on the carriage to operate said normally positioned control member, means operated by operation of said normally positioned member to determine operation of the totalizer to accumulate typed amounts during cycling of the general operator, said member being shiftable out of the path of said tappet, a second control member, tappet means on the carriage to operate said shiftable member in its shifted position and to operate said second member; total-reading means, type-selecting means and power-operated type-actuating means which may be called into play for said totalizer, and means effective in response to operation of said shifted member and said second control member, to call into play the three last said means to print a total from said totalizer automatically by means of said types.

5. In a machine of the character described, the combination of numeral types, a letter-feedable carriage cooperative therewith, a totalizer, indexable totalizer actuators of different denominations, denominational jacks operable seriatim by said carriage, a control member, means operable by said control member to connect said actuators to said jacks to enable the latter to shift said actuators to index-receiving positions, means cooperable with said totalizer to select said types for total printing, means, independent of said connecting means, normally disabling said type-selecting means, power means for actuating said types, said control member being shiftable, transversely of the carriage path, from a normal position to an alternative position and being operable by said carriage in either position, said control member being operative, at least from its normal position, to operate said connecting means and means, effective in response to operation of said control member in its alternative position, operative on said disabling means, to condition said type-selecting means to enable said jacks to control, seriatim, operation of the selected types by said power means.

6. In a machine of the character described, the combination of a plurality of registers of the type operable by a general operator after amount-indexing operations, a computing-zone-traversing carriage, a plurality or group of register-selecting cams, one for each register, shifter means operatively connected to said cams and operable for shifting said cams collectively transversely of the carriage path to one or another of a plurality of group positions, tappet means on the carriage, said tappet means including portions, one for each group position, to operate said cams selectively, for register selection, in each of the cam-group positions, and a plurality of total-taking control means, one for each register, becoming operatively connected to the cams by shift of the latter to one of said positions.

7. In a machine of the character described, the combination with register mechanism, driving mechanism, and a computing-zone-traversing carriage, of shiftable register control means, means operable to shift said control means from a normal position to a total taking control position, means on the carriage to operate said control means in either position, means operated by the operation of said control means in either position to predetermine operation of said register mechanism by said driving mechanism, means tending to return said control means from total taking control position to normal position, means acting to retain said control means in total taking control position, and means operable by the carriage at a predetermined place relatively to the computing zone and independently of said control means, to release said control means from said retaining means.

8. In a machine of the character described, the combination with numeral types, a letter-feedable carriage cooperative therewith, power-operable actuator and a plurality of totalizers, of tappet means movable with the carriage, control members, one for each totalizer, selectively operable by said tappet means, total-reading means, one for each of said totalizers, type-selecting means, said total-reading and type-selecting means being operable, in cooperation with a selected totalizer, to initiate typing of a total by said types for actuation by said power-operable actuator, means under control of said members, to connect a predeterminate one of said total-reading means with its totalizer, means including a movable member, to tabulate the carriage to a total-taking zone in which portions of said tappet means are effective, means actuatable by said power-operable actuator to move said movable member, and means including an element operable by said tappet means, to connect said member-moving means to the power-operable actuator.

9. In a machine of the character described, the combination with numeral types and a letter-feedable carriage cooperable therewith, of a plurality of registers, amount-indexing means including a set of carriage-operable denomination jacks, an array of rockable blades including a set of denomination blades connected to corresponding jacks and also including a plurality of extra blades, one for each register, a group of register-selecting cams, means operable for shifting the cams as a group from normal position to another position, means movable with the carriage to operate said cams selectively in each cam-group position, means operable by the cams in at least the normal cam-group position to operatively associate the corresponding registers with the set of denomination blades, means enabling the cams, when the cam-group is shifted, to operate the corresponding extra blades, means controllable for automatically operating said types to print a total from any register, and means responsive to operation of an extra blade to control said controllable means to determine printing of the total from the corresponding register.

10. In a machine of the character described, the combination with numeral types, a letter-feedable carriage cooperative therewith, a plurality of totalizers, and actuating mechanism operable for entering typed amounts into or taking typed totals from the totalizers, of a plurality of shiftable selectors, one for each totalizer, shifter means operable to shift the selectors from a normal position representing amount-entering to a position representing total-taking, means operable by each selector from either position to enable cooperation of the corresponding totalizer with said actuating mechanism, tappet-means on the carriage to operate the selectors selectively from their normal positions, tappet means on the carriage to operate the selectors selectively from their shifted positions, mechanism capable of acting under control of any totalizer and of the carriage and called into play by operation of any total-taking-positioned selector to effect automatically, for the corresponding totalizer, the selection and operation of the types corresponding to the total.

11. In a machine of the character described, the combination with numeral types, a letter-feedable carriage cooperative therewith, a plurality of totalizers, and actuating mechanism operable for entering typed amounts into or taking typed totals from the totalizers, of a plurality of shiftable selectors, one for each totalizer, shifter means operable to shift the selectors from a normal position representing amount-entering to a position representing total-taking, means operable by each selector from either position to enable cooperation of the corresponding totalizer with said actuating mechanism, tappet-means on the carriage to operate the selectors selectively from their normal positions, tappet means on the carriage to operate the selectors selectively from their shifted positions, total-reading and type-selecting mechanism for the totalizers for effective selection of the types, power mechanism for actuating the types, means operable under control of the carriage for causing actuation of the selected types by the power mechanism, and means acting in response to operation of any total-taking-positioned selector to cause to function, for the corresponding totalizer, said total-reading and type-selecting mechanism and the means operable under control of the carriage for causing actuation of the selected types by the power mechanism.

12. In a machine of the character described having a cycling general operator, the combination with numeral types, a letter-feedable carriage cooperable therewith, and a plurality of totalizers, of tappet-means movable with the carriage, control members, one for each totalizer, selectively operable by said tappet-means, state control devices, one for each totalizer, spring-urged to position preparatory to operation of the corresponding totalizer during cycling of the general operator, latches normally restraining said devices and each operatively connected to and retractible by a corresponding one of said control members to release its state control device, a total key and a subtotal key, means operable by either key to shift said control members jointly out of the path of said tappet-means, said latches remaining operatively connected to the shifted control members, a tappet movable with the carriage to operate a predetermined one of the shifted control members to select the corresponding totalizer for having its total printed, total-reading, type-selecting and type-actuating means which may be called into play, means effective in response to operation of said shifted control member to call said total reading, type-selecting and type-actuating means into play to print the total automatically by means of said types and means cooperable with said subtotal key to negative the release of all of said state control devices.

13. In a machine of the character described having numeral types, a letter-feedable carriage and a totalizer, the combination of a total key, a controller positionable by operation of said key so as to be operable by the carriage at a total printing zone, a cycling mechanism operable subsequently to total printing, a power-operable total symbol printer, means actuatable by said cycling mechanism to tend to cause a power operation of said total symbol printer, and means operable by said controller, normally preventing actuation of the last said means and effective, when controller-operated, to enable said cycling mechanism to determine power operation of the total symbol printer.

14. In a machine of the character described having numeral types, a letter-feedable carriage and a plurality of totalizers, a total key, a plurality of selectors, one for each totalizer, shiftable collectively by operation of said key to a position for selective operation by the carriage at a total printing zone to select one or another totalized for having its total printed, a cycling mechanism operable subsequently to total printing, a power operable total symbol printer, means actuatable by said cycling mechanism to tend to cause a power operation of said total symbol printer, a plurality of means respectively operable by said selectors, normally preventing actuation of the last said means and effective, when controller-operated, to enable said cycling mechanism to determine power operation of the total symbol printer.

15. In a machine of the character described, the combination with a work-sheet carriage, a plurality of totalizers and a cycling general operator, of a plurality of selector devices movable collectively from normal to alternative positions so as to be selectively operable in the alternative positions by said carriage to select one or another totalized for total taking, said general operator being cycled in respect to total taking, a clear sign printer common to said totalizers, means tending to operate said clear sign printer automatically during cycling of said general operator, means normally restraining operation of said clear sign printer during cycling of the general operator, and means, under joint control of a cleared totalized and of its carriage-operated total-taking-positioned device to condition said restraining means to permit operation of said clear-sign printer only in respect to the totalizer from which the total was taken.

16. In a machine of the character described, the combination with a work-sheet carriage and a plurality of totalizers, of a power-operable clear-sign printer common to said totalizers, a plurality of devices, one for each totalizer, to sense automatically whether said totalizer is clear, inducing means operable partly under control of each sensing device, and partly under control of said carriage in respect to a given zone clear-sign printer if any one of the totalizers is of carriage travel to induce operation of said clear, a plurality of blocking means, one for each totalizer, normally opposing operation of said clear sign printer through said inducing means, a total-key and means rendered effective by operation of said key to enable the carriage at said zone to select a predetermined totalizer for total taking and to render the corresponding blocking means ineffective.

17. In a machine of the character described, the combination with a work sheet carriage and a plurality of totalizers, of a plurality of selector devices, one for each totalizer, shiftable collectively from normal to alternative positions so as to be operable selectively in the alternative positions by the carriage to select one or another totalizer for total-taking, a power operable clear-sign printer, common to said totalizers, a plurality of sensing devices, one for each totalizer to sense automatically whether said totalizer is clear, inducing means operable under control of said sensing devices to induce power operation of said clear sign printer provided any one of said totalizers is clear as determined by its sensing device, a plurality of blocking means, one for each totalizer, normally opposing operation of said clear sign printer through said inducing means, each blocking means becoming operatively connected to a corresponding totalizer selector device by the movements of said devices to said alternative positions so that the carriage operation of said selector device renders the corresponding blocking means ineffective, whereby to confine clear-sign printing to the corresponding totalizer.

18. In a machine of the character described having a cycling general operator, the combination with numeral types, and a letter-feedable carriage cooperative therewith, of a plurality of sets of computing wheels and corresponding sets of total-reading feelers normally retracted from but tending to move to engage said wheels, a universal restorer for said sets of feelers tending to move away from said feelers and normally latched in position to oppose engagement of said feelers with said wheels, means operable to release said restorer, said restorer being subsequently returned by said cycling mechanism, a plurality of latch devices, one for each set of feelers, normally effective to restrain all of said sets of feelers when said restorer is released, and means operable by the carriage to operate a predetermined one or another of said latch devices to release the companion set of feelers at a given position of said carriage.

19. In a machine of the character described having a cycling general operator, the combination with numeral types and a letter-feedable carriage, of a plurality of totalizers and corresponding sets of total-readers normally retracted from but tending to move to engage said totalizers, a universal restorer for said sets of readers tending to move away from said readers and normally latched in position to oppose engagement of said readers with said totalizers, a plurality of latch devices, one for each set of readers normally effective to restrain all of said sets of readers when said restorer is released, totalizer selecting control members, one for each totalizer, a releaser for said restorer operatively connected to all of said control members so as to be operable by any member to release said restorer, releasers each operatively connected to and operable by a corresponding control member to release a corresponding set of readers from its latch device, and tappet means on the carriage for operating said control members selectively.

20. In a machine of the character described having numeral-devices and a letter-feedable carriage cooperative therewith, the combination of a computing wheel having a spiral array of digit-stops, a selector differentially movable from a retracted position to a device-selecting position against the digit-stop presented by said wheel, a selector restorer having a normal position corresponding to the retracted selector position, spring means urging movement of the selector to devices-selecting position and urging the restorer in recessional movement which is in excess of the maximum selector movement, latch means trippable by said carriage but normally restraining the restorer and selector against movement by said spring means, means actuated partly by the carriage and partly by the excess part of the recessional movement of said restorer to operate the devices-selecting-positioned selector, and means acting in response to operation of the selector to operate the selected devices.

21. In a machine of the character described having a totalizer, and types and a letter-feedable carriage for printing a sub-total digit-by-digit, the combination with said carriage and a general operator operable after printing the last digit of a sub-total, of mechanism operable preparatory to printing a sub-total, said mechanism including an operable device and means whereby said carriage at a sub-total printing zone operates said device, a power-operated actuator, a sub-total-sign type, means operable to cause said actuator to operate said sub-total-sign type, and a normally ineffective connection conditioned by operation of said mechanism, including the operation of said device by said carriage, to enable said general operator, during a general operator cycle, to operate the means that cause said actuator to operate said total-sign type.

22. In a computing machine of the character described, the combination with a tabulating carriage, a totalizer, a sub-total key, mechanism operable in response to operation of said key to tabulate said carriage to a total taking zone and therefore possibly skipping precedent zones, a cycling mechanism induced by said carriage at any zone to operate automatically, a sub-total taking control means becoming set in response to momentary operation of said sub-total key before the resulting tabulating movement of said carriage, and means becoming conditioned under control of the carriage only at the total taking zone to connect operatively said control to the cycling mechanism to enable the cycling mechanism, when operated for said latter zone, to restore said sub-total taking control means.

23. In a computing machine of the character described, the combination with a tabulating carriage, a totalizer, a sub-total key, mechanism operable in response to operation of said key to tabulate said carriage to a total taking zone and therefore possibly skipping precedent zones, a cycling mechanism induced by said carriage at any zone to operate automatically, a power actuator, a symbol-printing type, means becoming set in response to momentary operation of said sub-total key, means becoming conditioned under control of the carriage only at the total taking zone to connect operatively said set means to the cycling mechanism to enable said cycling mechanism, when operated for said latter zone, to restore said set means, and means operated by the restoration of said set means to connect said symbol printing type to said actuator for resulting operation of said type.

HENRY L. PITMAN.

CERTIFICATE OF CORRECTION.

Patent No. 2,372,681. April 3, 1945.

HENRY L. PITMAN.

It is hereby certified that error appears in the printed specification of the above numbered patent requiring correction as follows: Page 16, second column, line 73, claim 15, for the word "totalized" read --totalizer--; page 17, first column, line 12, claim 16, strike out "clear-sign printer if any one of the totalizers is" and insert the same after "said" in line 13, same claim; and that the said Letters Patent should be read with this correction therein that the same may conform to the record of the case in the Patent Office.

Signed and sealed this 12th day of June, A. D. 1945.

Leslie Frazer (Seal) Acting Commissioner of Patents.